United States Patent
Schreier et al.

(10) Patent No.: US 12,442,090 B2
(45) Date of Patent: Oct. 14, 2025

(54) ELECTROCHEMICAL BREAKING OF C—C BONDS

(71) Applicant: Wisconsin Alumni Research Foundation, Madison, WI (US)

(72) Inventors: Marcel Schreier, Pfeffingen (CH); Christine Lucky, Madison, WI (US); Harshal Bakshi, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 17/959,744

(22) Filed: Oct. 4, 2022

(65) Prior Publication Data

US 2023/0106006 A1 Apr. 6, 2023

Related U.S. Application Data

(60) Provisional application No. 63/251,763, filed on Oct. 4, 2021.

(51) Int. Cl.
| | | |
|---|---|---|
| C25B 3/03 | (2021.01) | |
| C25B 3/23 | (2021.01) | |
| C25B 9/15 | (2021.01) | |
| C25B 11/02 | (2021.01) | |
| C25B 11/065 | (2021.01) | |
| C25B 11/089 | (2021.01) | |
| C25B 15/08 | (2006.01) | |

(52) U.S. Cl.
CPC ............ *C25B 3/03* (2021.01); *C25B 9/15* (2021.01); *C25B 11/02* (2013.01); *C25B 11/065* (2021.01); *C25B 11/089* (2021.01); *C25B 15/083* (2021.01)

(58) Field of Classification Search
CPC .................................. C25B 3/03; C25B 3/23
USPC ................................................. 205/462, 463
See application file for complete search history.

(56) References Cited

U.S. PATENT DOCUMENTS

| | | | | |
|---|---|---|---|---|
| 2013/0105330 A1* | 5/2013 | Teamey | ................ | C25B 13/08 |
| | | | | 205/349 |
| 2019/0078218 A1* | 3/2019 | Weissman | ................ | C07C 5/03 |
| 2021/0164115 A1* | 6/2021 | Arges | .................... | C25B 5/00 |

FOREIGN PATENT DOCUMENTS

| | | | | |
|---|---|---|---|---|
| WO | WO-2021212236 A1 * | 10/2021 | ....... | B01D 71/02231 |
| WO | WO-2021257972 A1 * | 12/2021 | ............... | C25B 1/02 |

OTHER PUBLICATIONS

Bełtowska-Brzezinska et al., "Propene Oxidation and Hydrogenation on a Porous Platinum Electrode in Acidic Solution," The Journal of Physical Chemistry B. (May 22, 2003), vol. 107, No. 20, pp. 4793-4800. (Year: 2003).*

(Continued)

*Primary Examiner* — Edna Wong
(74) *Attorney, Agent, or Firm* — Joseph T. Leone; Yanjun Ma; DeWitt LLP

(57) ABSTRACT

Electrochemical systems and methods for cleaving C—C bonds are disclosed. In performing the method, a reactant adsorption electrical potential, a C—C bond breaking electrical potential, and a desorption electrical potential are sequentially applied to an electrode pair contacting a composition initially containing a target chemical reactant, such as a polymer or alkane. As a result of performing the method, one or more desired chemical products, such as smaller alkane-containing molecules, are released from the electrode into the region between the electrode pairs. The method may be performed at ambient temperatures using renewable electricity.

25 Claims, 22 Drawing Sheets

(56) References Cited

OTHER PUBLICATIONS

Gilman, "Studies of Hydrocarbon Surface Processes by the Multipulse Potentiodynamic Method. Part 1.—Kinetics and Mechanisms of Ethane Adsorption on Platinum," Transactions of the Faraday Society (1965), vol. 61, pp. 2546-2560. (Year: 1965).*

Gilman, "Studies of Hydrocarbon Surface Processes by the Multipulse Potentiodynamic Method. Part 2.—Kinetics and Mechanism of Desorption of Ethane from Platinum," Transactions of the Faraday Society (1965), vol. 61, pp. 2561-2568. (Year: 1965).*

Ma et al., "Surface Structure Effects of Electrocatalytic Conversion of Ethane on Pt Single Crystal Electrodes," Journal of Electroanalytical Chemistry (Sep. 1, 2021), vol. 896, pp. 1-9. (Year: 2021).*

Schmiemann et al., "The Influence of the Surface Structure on the Adsorption of Ethene, Ethanol and Cyclohexene as Studied by DEMS," Electrochimica Acta (Jan. 1, 1995), vol. 40, No. 1, pp. 99-107. (Year: 1995).*

Ferre-Vilaplana et al., "Cleavage of the C—C bond in the Ethanol Oxidation Reaction on Platinum. Insight from Experiments and Calculations," The Journal of Physical Chemistry C (Jun. 2, 2016), vol. 120, No. 21, pp. 11590-11597. (Year: 2016).*

Lehmann et al., "An Electrochemical Flow-Through Cell for Rapid Reactions," Industrial & Engineering Chemistry Research (Mar. 26, 2020), vol. 59, No. 16, pp. 7321-7326. (Year: 2020).*

Niedrach, "Studies of Hydrocarbon Fuel Cell Anodes by the Multipulse Potentiodynamic Method: II. Behavior of Methane on Conducting Porous Teflon Electrodes," Journal of The Electrochemical Society (Jul. 1, 1966), vol. 113, No. 7, pp. 645-650. (Year: 1966).*

Monyoncho et al., "Computational Screening for Selective Catalysts: Cleaving the CC Bond During Ethanol Electro-Oxidation Reaction," Electrochimica Acta (Jun. 1, 2018), vol. 274, pp. 274-278. (Year: 2018).*

Niedrach, "Galvanostatic and Volumetric Studies of Hydrocarbons Adsorbed on Fuel Cell Anodes," Journal of The Electrochemical Society (Dec. 1, 1964), vol. 111, No. 12, pp. 1309-1317. (Year: 1964).*

Almithn, A. & Hibbitts, D. Comparing Rate and Mechanism of Ethane Hydrogenolysis on Transition-Metal Catalysts. *J. Phys. Chem. C* 123, 5421-5432 (2019).

A. M. Feltham, M. Spiro (1971) "Platinized platinum electrodes," Chem. Rev. 71: 177-193.

Cortright, R. D., Watwe, R. M., Spiewak, B. E. & Dumesic, J. A. Kinetics of ethane hydrogenolysis over supported platinum catalysts. *Catal. Today* 53, 395-406 (1999).

Daehn, K. et al. Innovations to decarbonize materials industries. *Nat. Rev. Mat.* 7, 275-294 (2021).

D. B. Trimarco, S. B. Scott, A. H. Thilsted, J. Y. Pan, T. Pedersen, O. Hansen, I. Chorkendorff, P. C. K. Vesborg (2018) "Enabling real-time detection of electrochemical desorption phenomena with sub-monolayer sensitivity," *Electrochim. Acta.* 268: 520-530.

Fukuda, M., Rulfs, C. L. & Elving, P. J. Fuel cells—I. Propane on palladium catalyst. *Electrochim. Acta* 9, 1551-1562 (1964).

Imada, H. et al. Real-space investigation of energy transfer in heterogeneous molecular dimers. *Nature* 538, 364-367 (2016).

Ma, H., Hao, P., Ye, J.-Y., Zhou, Z.-Y. & Sun, S.-G. Surface structure effects of electrocatalytic conversion of ethane on Pt single crystal electrodes. *J. Electroanal. Chem.* 896, 115252 (2021).

Van Geem, K. M., Galvita, V. v. & Marin, G. B. Making chemicals with electricity. *Science* 364, 734-735 (2019).

Xia, R., Overa, S. & Jiao, F. Emerging Electrochemical Processes to Decarbonize the Chemical Industry. *J. Am. Chem. Soc. Au* 2, 1054-1070 (2022).

* cited by examiner

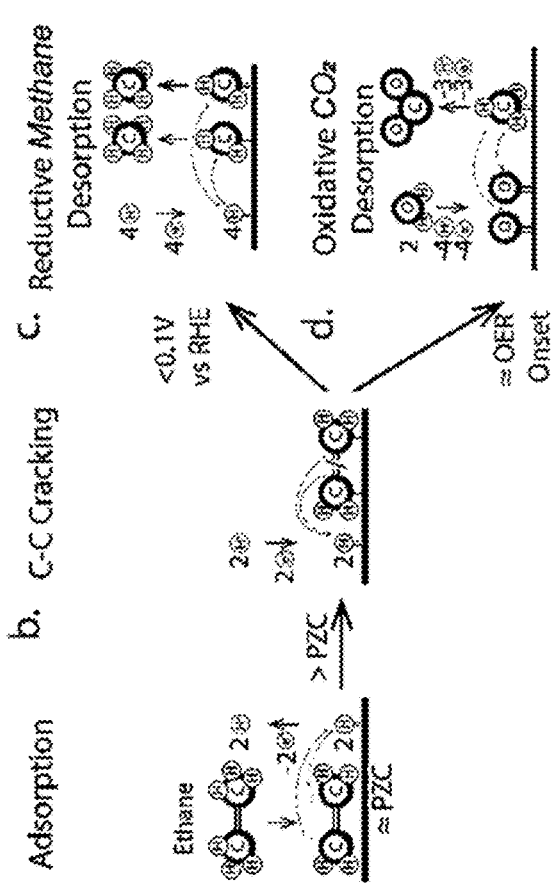

*FIG. 3A*
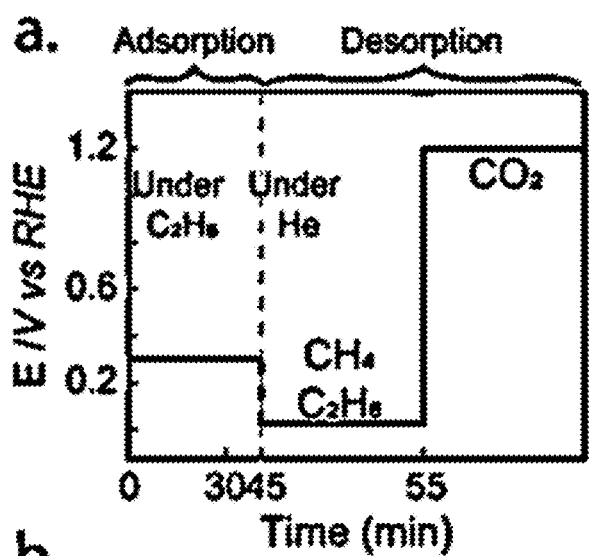
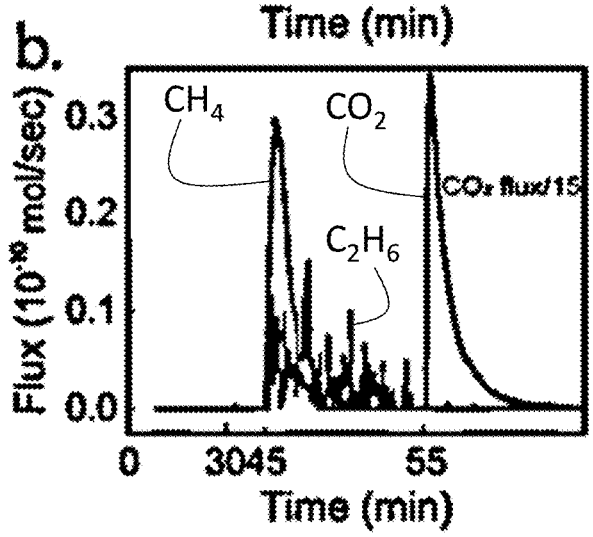
*FIG. 3B*

FIG. 6A
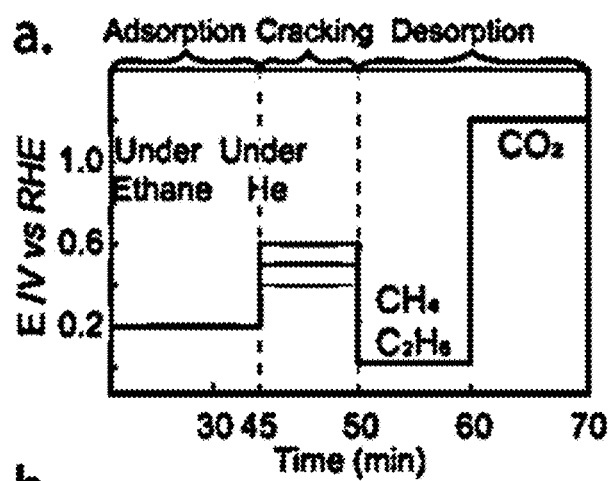
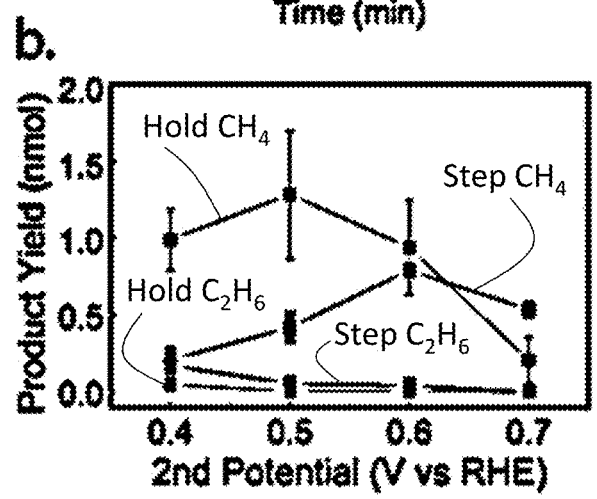
FIG. 6B

ELECTROCHEMICAL BREAKING OF C—C BONDS

CROSS-REFERENCE TO RELATED APPLICATIONS

Benefit is hereby claimed to provisional application Ser. No. 63/251,763, filed Oct. 4, 2021, which is incorporated herein by reference.

STATEMENT REGARDING FEDERALLY SPONSORED RESEARCH OR DEVELOPMENT

Not applicable.

FIELD

This disclosure relates generally to methods of electrochemically breaking one or more C—C bonds, preferably at ambient room temperature, in a target chemical reactant to produce a desired chemical product. In particular, the disclosure is directed to a method of sequentially applying to a C—C bond-containing reactant (a) a reactant adsorption electrical potential, whereby the reactant is adsorbed to an electrode; (b) a C—C bond breaking electrical potential; and (c) a desorption electrical potential, whereby product is desorbed from the electrode. In this fashion, a target chemical reactant comprising one or more C—C bonds is converted to a desired chemical product.

BACKGROUND

Plastics are an intrinsic element of modern society, but their use comes at a significant environmental cost. Plastic production alone accounts for 3.8% of global $CO_2$ emissions and an estimated 300 million tons of plastic waste per year.

Significant research has gone into converting waste plastics into value-added chemicals and fuels. However, existing recycling technologies remain limited by their reliance on fossil-derived thermal energy. A truly sustainable circular economy must be driven by a sustainable energy source.

While several techniques for mechanical and thermal polyethylene terephthalate (PET) and polyethylene (PE) recycling have been implemented on an industrial scale, the current state of the art for recycling and upcycling such waste is the thermal pyrolysis. Pyrolysis is the thermal degradation of plastic waste at elevated temperatures, in the absence of oxygen, to produce shorter chain products. For PET- and/or PE-containing waste streams, effective pyrolysis requires temperatures over 500° C., thus making the process highly energy intensive. Presently, the most efficient way to provide this thermal energy is via the burning of fossil fuels. This increases the carbon footprint of the process and undercuts the benefit of displacing fossil fuel-based feedstocks in plastic production. Moreover, the inherent mechanism of pyrolysis results in poor selectivity between saturated and unsaturated products. The products therefore require additional downstream separation and processing to be used as chemical feedstocks. These additional processing steps increase the process complexity and associated emissions and decrease potential profitability.

The poor selectivity between the resulting alkanes and alkenes are a function of the two pathways present in thermal pyrolysis. The first pathway involves the homolytic cleavage of a C—C bond followed by a disproportionation step, resulting in the production of one saturated and one monounsaturated hydrocarbon. The disproportionation mechanism therefore limits the maximum theoretical selectivity for alkane production via pyrolysis to 50%.

The second major pathway in pyrolysis produces polyunsaturated hydrocarbons and molecular hydrogen through a dehydrogenation mechanism, which adds further complexity to the product mixture. Experimental data shows that the disproportionation mechanism is significant at 500° C., resulting in a ratio of unsaturated-versus-saturated products of between 1:1 and 10:1, with no known means to control product selectivity.

Hydrogenolysis is another commonly-used method for degrading longer chain hydrocarbons. In hydrogenolysis, hydrogen gas is used with an appropriate catalyst to cleave C—C bonds. Hydrogenolysis has a distinct disadvantage in that the molecular hydrogen required by the process in suppresses the reaction rate, yielding unacceptably long reaction times.

More universally, making and breaking $C(sp^3)$—$C(sp^3)$ bonds in alkanes lies at the very heart of petrochemical refining and many other chemical processes. For example, breaking C—C bonds in long polymer chains is necessary to establish practical plastics recycling technologies. As noted above, the conventional routes have low energy efficiency, poor selectivity, and high carbon emissions. Concomitantly over the past decade, increased generation of electricity via solar and wind has led to rapidly decreasing costs for renewable electricity, making it an attractive clean energy source for chemical transformations. Transforming $C(sp^3)$—$C(sp^3)$ bonds using renewable electricity therefore represents a crucial but thus far underexplored avenue to a Net-Zero chemical industry. See, for example, Xia, R., Overa, S. & Jiao, F. Emerging Electrochemical Processes to Decarbonize the Chemical Industry. *J. Am. Chem. Soc. Au* 2, 1054-1070 (2022); Daehn, K. et al. Innovations to decarbonize materials industries. *Nat. Rev. Mat.* 7, 275-294 (2021); and Van Geem, K. M., Galvita, V. v. & Marin, G. B. Making chemicals with electricity. *Science* 364, 734-735 (2019).

Electrochemistry is uniquely suited to electrify chemical manufacturing because it intimately couples renewable electrical driving forces to chemical transformations. An understanding of how electrochemical potentials influence the transformation of alkanes is largely lacking, however. Still, work on hydrocarbon fuel cells in the 1960s demonstrated that alkanes can be electrochemically oxidized to $CO_2$ at temperatures near 100° C. See, for example, Fukuda, M., Rulfs, C. L. & Elving, P. J. Fuel cells-I. Propane on palladium catalyst. *Electrochim. Acta* 9, 1551-1562 (1964). Mechanistic investigations highlighted that during the oxidation process, alkanes fragment and small amounts of hydrocarbons with decreased chain lengths are formed. See Ma, H., Hao, P., Ye, J.-Y., Zhou, Z.-Y. & Sun, S.-G. Surface structure effects of electrocatalytic conversion of ethane on Pt single crystal electrodes. *J. Electroanal. Chem.* 896, 115252 (2021). This demonstrates that C—H and C—C bonds can be electrocatalytically transformed at more moderate temperatures, a surprising fact, given that temperatures of 300-400° C. are required to drive the same reactions on Pt in thermal chemistry. Cortright, R. D., Watwe, R. M., Spiewak, B. E. & Dumesic, J. A. Kinetics of ethane hydrogenolysis over supported platinum catalysts. *Catal. Today* 53, 395-406 (1999).

Accordingly, there is a need in the art for improved systems and methods for upcycling plastics that address the issues associated with both pyrolytic polyethylene upcycling and hydrogenolysis.

SUMMARY

We disclose herein an improved electrochemical method for breaking one or more C—C bonds in a chemical reactant to synthesize one or more desired products. The method can be applied cyclically, and can be used in a wide range of chemical reactions involving the cleavage of C—C bonds, including, without limitation, the upcycling of plastics. The method may be powered by renewably sourced electricity, and can operate with minimal external energy input. In addition, the method allows the storage of renewable electricity in the bonds of the products. Furthermore, the disclosed method does not require the intense process conditions of conventional methods for upcycling plastics, and can be performed at room temperature and ambient pressure.

The disclosed cyclic electrochemical method provides increased control over reaction conditions, resulting in improved selectivity to the desired products. In performing the method, selectivity between desorption of cracked and uncracked products is dependent on the applied potential, meaning that quantitative selectivity can theoretically be reached for short alkane products by first adsorbing and then cracking the adsorbed intermediate on the same surface via potential control.

The method described herein is broadly applicable to the electrification of hydrocarbon transformation processes, which form the backbone of the chemical industry. Its importance thus transcends the field of plastics upcycling. Thus, the disclosed method is a key technology in the long-term vision involving the complete replacement of the chemical industry's driving force with renewably sourced electricity, opening the doors to sustainable advanced manufacturing via direct use of renewable electricity to produce chemical feedstocks such as, but not limited to, ethane, propane, butane, and other short alkanes from plastics such as low- or high-density polyethylene, with potential for application to traditionally unrecyclable plastics such as polyvinyl chloride (PVC) and polystyrene (PS).

Accordingly, in a first aspect, the disclosure encompasses a method for producing one or more desired chemical products from one or more chemical reactants, where the one or more chemical reactants include one or more C—C bonds. The method includes the steps of (a) applying a reactant adsorption electrical potential to a pair of separated electrodes contacting a composition comprising the one or more chemical reactants, whereby the one or more chemical reactants are adsorbed to one of the electrodes; (b) applying a C—C bond breaking electrical potential to the electrode pair, whereby the C—C bond in the one or more adsorbed chemical reactants is broken, resulting in one or more desired chemical products formed from the breaking of the C—C bond; and (c) applying a desorption electrical potential to the electrode pair, whereby the one or more desired chemical products are released from the electrode into the region between the electrode pairs.

In some embodiments, the method occurs at a temperature of below 100.0° C. In some such embodiments, the method occurs at a temperature of between about 0.0° C. and about 100.0° C. In some such embodiments, the method occurs at a temperature of between about 4° C. and about 50° C. In still other version, the method occurs at a temperature of between about 15° C. and about 30° C.

In some embodiments, the method occurs at ambient temperature, without an externally applied source of heat other than the applied electrical potentials.

In some embodiments, the method occurs at ambient pressure. In some such embodiments, the ambient pressure is between 0.8 and 1.2 atm.

In some embodiments, the method occurs within a flow cell. In such embodiments, the composition of step (a) and the contents of the region between the separated electrodes while performing the steps (b) and (c) continuously flow through the cell. In some such embodiments, the method occurs within an electrochemical flow reactor.

In some embodiments the reaction occurs in a gas phase cell with a polymer or solid electrolyte. In some such embodiments the reaction occurs above the boiling point of the substrate and products.

In some embodiments, step (b) includes applying a C—C bond breaking electrical potential to the electrode pair, whereby the C—C bond in the one or more adsorbed chemical reactants is broken, resulting in one or more desired chemical intermediates formed from the breaking of the C—C bond and are subsequently desorbed to form the desired chemical products.

In some embodiments, steps (a), (b) and (c) are repeated through multiple cycles. In some such embodiments, the electrical potentials of steps (a), (b) and (c) are applied to the electrode pair through multiple continuous alternating electrical potential cycles. In some such embodiments, the alternating electrical potential cycles occur at a rate of 0.001 Hz to 10,000.0 Hz.

In some embodiments, the desorption electrical potential applied in step (c) is specific to a desired chemical product. In some such embodiments, only the desired chemical product is desorbed in step (c), thus releasing purified desired chemical product to the region between the separated electrodes. In some such embodiments, when step (c) is performed, the region between the separated electrodes does not include the one or more chemical reactants, thus facilitating purification of the desired chemical product. In some such embodiments, the region between the separated electrodes consists essentially of an inert gas and released desired chemical product.

In some embodiments, the electrodes include a conductive carbon support. In some such embodiments, the conductive carbon support includes a high surface area surface.

In some embodiments, the electrode surfaces include one or more metals. In some such embodiments, metal particles are deposited onto the electrode surfaces.

In some embodiments, the one or more metals included on the electrode surfaces are selected from the group including, but not limited to, Pt, Au, Ag, Cu, Fe, Rh, Ni, Pd, Jr, Co, V, Cr, Sn, Ti, W, and alloys, sulfides, nitrides, oxides, and carbides thereof. Compound alloys may also be used, such as CoMo sulfide, NiMo sulfide, Mn oxide/$SnO_2$, Co oxide/$SnO_2$, MoV mixed metal oxide (MMO), TeNb MMO, and W-doped MoVMn.

In some embodiments, the one or more chemical reactants are saturated hydrocarbons, unsaturated hydrocarbons, or polymers. In some such embodiments, the polymers are obtained from recycled plastic or waste plastic.

In some embodiments, the one or more chemical reactants may include $C_2$ to $C_{12}$ alkanes, such as ethane, propane, propylene, butane, butylene, pentane, octane, etc. The reactant may also include an addition polymer, or a condensation polymer. In some such embodiments, the addition polymer or condensation polymer may include low-density polyethylene (LDPE), high-density polyethylene (HDPE), polyvinyl chloride, polypropylene, and/or polystyrene.

In some embodiments, the one or more desired chemical products are the result of breaking one or more C—C bonds of the one or more reactants. In some such embodiments, the desired chemical products are alkanes or other hydrocarbons that are shorter than the one or more reactants. In some such embodiments, the desired chemical products are $C_1$-$C_{10}$ alkanes. In some such embodiments, the desired chemical products may include methane, ethane, propane, and butane.

In some embodiments, the reactant adsorption electrical potential is slightly positive of the potential zero charge (PZC) of the system made up of any catalyst included on the electrode pair and the composition contacting the electrode pair.

In some embodiments, the C—C bond breaking electrical potential is significantly more oxidative than the potential zero charge (PZC) of the system made up of any catalyst included on the electrode pair and the composition contacting the electrode pair. In some such embodiments, the magnitude of the cracking potential affects the yield of desorbing cracked products. In some such embodiments, the yield of cracked products is increased beyond the limit observed from reaction thermodynamics for simultaneous adsorption and cracking, due to the favorable formation of C—C bond broken intermediates following adsorption at a highly favorable adsorption potential.

In some embodiments, the desorption electrical potential facilitates either reductive or oxidative desorption. In some such embodiments, the desorption electrical potential that facilitates reductive desorption is less than 0.2 volts relative to the reversible hydrogen electrode (RHE).

In some embodiments, the desorption electrical potential facilitates reductive desorption, and desorption occurs without generating hydrogen.

In some embodiments, the composition contacting the electrode pair or region between the separated electrodes includes an acid.

In some embodiments, the composition contacting the electrode pair or region between the separated electrodes includes one or more solvents. In some such embodiments, the one or more solvents include an organic solvent.

In some embodiments, one or more of the reactant adsorption electrical potential, the C—C bond breaking electrical potential, and desorption electrical potential are selected to optimize the selectivity of the method for the selected chemical reactants and/or selected desired chemical products.

Other objects, features and advantages of the present invention will become apparent after review of the specification, claims and drawings.

The method disclosed herein takes advantage of the unique properties of electrochemistry to gain control over alkane transformations in ways that are currently inaccessible by thermal catalysis. In thermocatalysis, reaction outcomes are governed by the properties of a catalyst surface. Once reactants are adsorbed to a catalyst, their reaction sequence is predetermined by the free energy landscape. This landscape must facilitate adsorption, transformation, and desorption under constant conditions, limiting the control over selectivity branchpoints. Electrode potentials, on the other hand, can be rapidly changed to manipulate the free energy landscape during a catalytic reaction. Changes in the applied potential steer the reaction by both (a) modulating the rate of electron transfer; and (b) tuning the stability of substrates, intermediates, and products on the surface through rearrangements of the electrochemical double layer. Exploiting this control enables the stepwise progression through the elementary steps of a catalytic transformation.

These advantages are realized in the present method by employing dynamic electrode potentials to activate and fragment $C(sp^3)$—$C(sp^3)$ bonds in ethane at room temperature (defined herein as about 15° C. to about 30° C.). The mix of products was determined by real-time observation of alkanes under the action of electrode potentials using electrochemical mass spectrometry (EC-MS), allowing desorbing compounds to be analyzed with sub-monolayer sensitivity. As discussed below, the data show that changes to the electrode potential after ethane adsorption allow precise control of the transformation of intermediates while they are bound to the surface—a feat that is unachievable using classical thermocatalytic methods. Using this approach, the present method will, for example, produce methane electrocatalytically, at room temperature, from a larger carbon-containing reactant comprising at least one $C(sp^3)$—$C(sp^3)$ solely via manipulation of the potential applied to an electrode surface.

The method disclosed herein extends beyond the fragmentation of C—C single bonds. By gaining precise control over each elementary step of a catalytic hydrocarbon transformation sequence, the method is broadly applicable to drive other electrocatalytic alkane transformations. The method those provides a route for electrifying crucial transformations in the chemical industry.

BRIEF DESCRIPTION OF THE DRAWINGS

FIGS. 2A, 2B, 2C, and 2D are sequential illustrations of the mechanism of the electrochemical ethane adsorption (2A), cracking (2B), and desorption (2C and 2D) processes.

FIG. 3A is an illustration of a potential program involving ethane adsorption at +0.3 V vs RHE followed by reductive and then oxidative electrode potential steps.

FIG. 3B is a graph showing the mass spectrometry measurements while the potential program illustrated in FIG. 3A is applied. The measurements indicate desorption of ethane, methane (indicative of C—C breaking), and $CO_2$ during the reductive and oxidative steps, respectively.

FIG. 6A is an illustration of a potential program involving ethane adsorption at +0.2 V vs RHE followed by displacing ethane with He and subsequently stepping to varying oxidative potentials for 5 minutes and lastly stepping reductively and oxidatively to desorb products.

FIG. 6B is a graph demonstrating $CH_4$ and $C_2H_6$ desorption upon the reductive step detailed in FIG. 6A compared to $CH_4$ and $C_2H_6$ desorption upon the reductive step detailed in FIG. 5A.

DETAILED DESCRIPTION

I. In General

Figure 1:
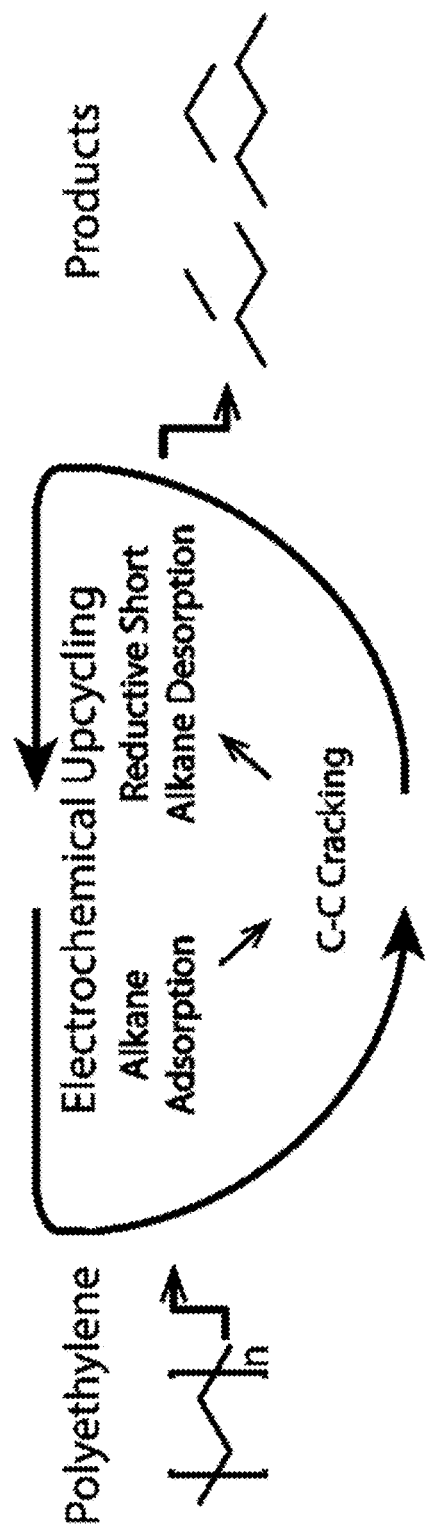
FIG. 1 is a schematic illustration of the disclosed electrochemical process that breaks C—C bonds. This technology enables up-cycling of polyolefins, and other hydrocarbons, ideally driven by renewable electricity.

This disclosure is not limited to the particular methodology, protocols, materials, and reagents described, as these may vary. The terminology used herein is for the purpose of describing particular embodiments only, and is not intended to limit the scope of the invention.

As used herein and in the appended claims, the singular forms "a", "an", and "the" include the plural forms unless the context clearly dictates otherwise. As well, the terms "a" (or "an"), "one or more" and "at least one" can be used interchangeably, and the terms "comprising", "including", and "having" can be used interchangeably.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, non-limiting specific methods and materials are now described. All publications and patents specifically mentioned herein are incorporated by reference for all purposes including describing and disclosing the chemicals, instruments, statistical analysis and methodologies which are reported in the publications which might be used in connection with the invention. All references cited in this specification are to be taken as indicative of the level of skill in the art.

The following abbreviations are used throughout the present disclosure: HDPE=high-density polyethylene. H-UPD=hydrogen underpotential deposition. LDPE=low-density polyethylene. PE=polyethylene. PET=polyethylene terephthalate. PS=polystyrene. PVC=polyvinyl chloride. PZC=potential zero charge of the catalyst/solvent system. RHE=reversible hydrogen electrode.

II. The Invention

Overview

We disclose herein a method for producing one or more desired chemical products from one or chemical reactants having one or more C—C bonds. The method includes the steps of sequentially applying a reactant adsorption electrical potential to a pair of separated electrodes contacting a composition that includes the one or more chemical reactants, applying a C—C bond breaking electrical potential to the electrode pair, and applying a desorption electrical potential to the electrode pair.

The disclosed cyclic electrochemical methods provide increased control over reaction conditions, resulting in improved selectivity to the desired products. The selectivity between desorption of cracked and uncracked products is dependent on the applied potential, meaning that 100% selectivity can theoretically be reached for short alkane products by first adsorbing and then cracking the adsorbed intermediate on the same surface via potential control.

The disclosed methods provide a path to sustainable advanced manufacturing via direct use of renewable electricity to produce chemical feedstocks such as, but not limited to, ethane, propane, butane, and other short alkanes from plastics, such as low- or high-density polyethylene, with potential for application to traditionally unrecyclable plastics such as polyvinyl chloride (PVC) and polystyrene (PS).

The following example is offered as an introduction to the method for illustrative purposes only, and is not intended to limit the scope of the present invention in any way. Indeed, various modifications of the invention in addition to those shown and described herein will become apparent to those skilled in the art from the foregoing description and the following examples and fall within the scope of the appended claims. Here, the data were generated using a model system incorporating short chain alkanes as reactants to provide "proof of principle" for using the disclosed method more generally to break one or more C—C bonds in one or more chemical reactants to make one or more desired chemical products.

The development of advanced chemical manufacturing requires addressing long-standing efficiency and sustainability challenges in contemporary chemical processes. This will require disruptive changes on the molecular level to the reactions which currently power chemical production.

The process accomplishes the room temperature activation of aliphatic C—H and C—C bonds driven solely by electricity. FIG. 1 is an abbreviated schematic illustration of the disclosed electrochemical process that breaks C—C bonds. This technology enables up-cycling of polyolefins, and other hydrocarbons, ideally driven by renewable electricity.

The method relies on cyclically varying an electrochemical potential, as shown in FIGS. 2A, 2B, 2C, and 2D. The method is based on cycling the electrochemical potential applied to an electrocatalyst t mediate the binding of alkanes to the electrocatalyst surface, followed by discrete C—C bond-breaking and desorption steps. Experiments have been carried out on high-surface-area metal electrocatalysts (platinum is preferred) in an acidic environment. The products were analyzed by in-line mass spectrometry. The reaction takes place in a series of steps which are individually controlled by the electrochemical potential and described in more detail below.

1. Adsorption of Ethane.

In a first step, ethane is introduced into the electrolyte, resulting in its adsorption onto a Pt surface as an uncharged and dehydrogenated ethyl intermediate (FIG. 2A). The adsorption occurs preferentially at potentials slightly positive of the potential of zero charge (PZC) of the catalyst/solvent system. The subsequent reductive desorption of bound ethane (FIG. 2C) and oxidative desorption of $CO_2$ (FIG. 2D) from the electrode surface clearly demonstrate the initial adsorption process and its dependence on the electrical potential applied to the electrocatalyst.

2. C—C Bond Fragmentation.

Upon maintaining a positive charge on the electrode, the C—C bond of the adsorbed ethyl fragment is broken. Without being limited to any underlying mechanism or phenomenon, we surmise that scission of the bond results in the formation of two surface-adsorbed methyl fragments (FIG. 2B). This step occurs preferentially at potentials above and including 0.3V vs RHE and below and including 0.6 V vs RHE as evidenced by the significant reductive desorption of methane at these potentials. See FIG. 3A. Furthermore, adsorption at 0.2-0.3 V vs RHE results in significant ethane desorption. This indicates that the adsorbed ethyl surpasses a threshold oxidative potential to effectively undergo C—C bond breaking and form adsorbed methyl, which subsequently desorbs as methane.

3. Desorption of Products from the Surface.

The third step involves the desorption of the surface-bound intermediates formed in the second step. If a potential negative of 0.2 V vs RHE is applied, the platinum surface becomes populated with hydrogen atoms through the reduction of solution protons. This process is called hydrogen underpotential deposition (H-UPD). The generated surface-H species are capable of hydrogenating adsorbed methyl and ethyl groups, which subsequently desorb as methane and ethane, respectively. See FIG. 2C. This was observed experimentally in the appearance of methane and ethane desorption signals, generated during a linear scan of the potential in the cathodic direction following ethane adsorption at 0.4V, as shown in FIG. 3B.

4. Bypassing the Thermodynamic Limit of C—C Bond Breaking.

Figure 5A:
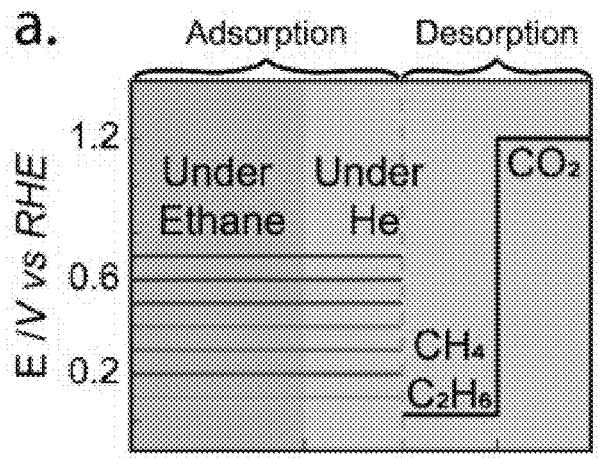
FIG. 5A is an illustration of a potential program involving ethane adsorption at varying potentials for 0.5 h followed by reductive and oxidative potential steps to desorb products.
Figure 5B:
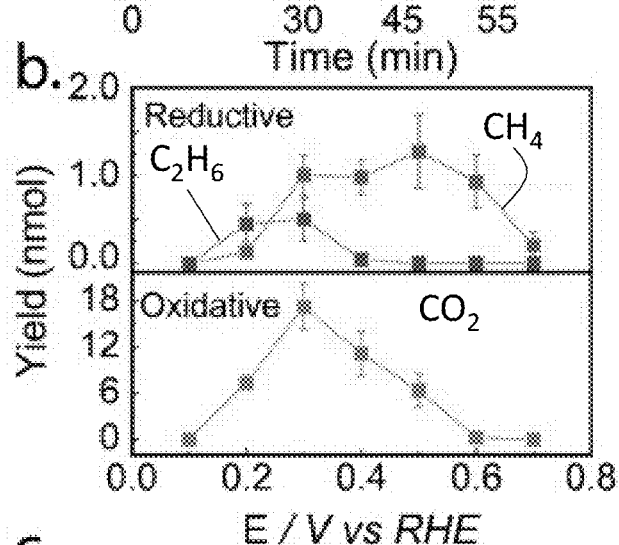
FIGS. 5B and 5C are graphs demonstrating $CH_4$, $C_2H_6$, and $CO_2$ yield and selectivity, respectively, after 0.5 h of exposure to ethane in the potential program detailed in FIG. 5A.
Figure 5C:
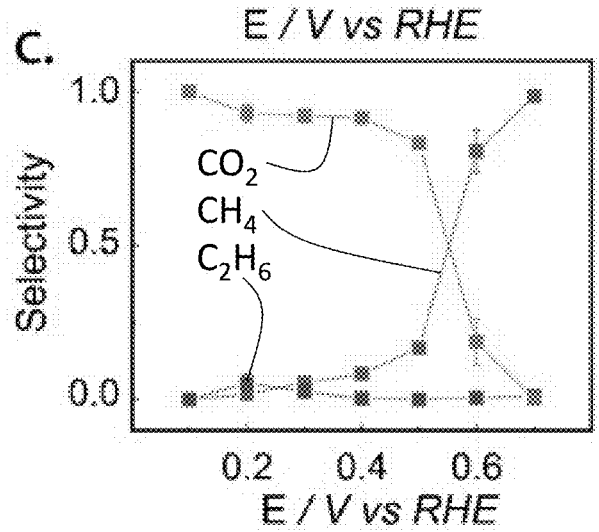

Adsorbing ethane at 0.2 V vs RHE followed by stepping to varying oxidative potentials for 5 minutes and lastly desorbing with reductive and oxidative steps (see FIGS. 6A, and 6B) can be compared to simply adsorbing at the varying oxidative potentials (see FIGS. 5A, 5B, and 5C). In comparing the results (FIG. 6B), it was observed that when adsorbing ethane at 0.2 V and subsequently stepping to 0.4-0.6 V vs RHE for 5 min, the yield of methane is less compared to when ethane is adsorbed at 0.4-0.6 V vs RHE. However, when ethane was adsorbed at 0.2 V and then stepping to 0.7 V vs RHE for 5 min, the methane yield exceeded that expected from a 0.7 V vs RHE ethane adsorption potential. This indicates that by adsorbing at a favorable adsorption potential and subsequently stepping to a favorable C—C bond breaking potential, the initially adsorbed ethyl intermediate stays on the surface and is converted to a cracked intermediate with greater yield than that observed during the adsorption at 0.7 V vs RHE. Such behavior highlights the possibility of exceeding the thermodynamic limits of methane yield for simultaneous adsorption and cracking, due to ethane cracking via potential manipulation in discrete adsorption and cracking steps.

5. Exemplary Electrode Materials.

In some embodiments, one or more of the electrodes used in the disclosed method may include one or more metals. Non-limiting exemplary of metals that could used, either alone or in combination with other metals, include Pt, Au, Ag, Cu, Fe, Rh, Ni, Pd, Ir, Co, V, Cr, Sn, Ti, W, and alloys, sulfides, nitrides, oxides, and carbides thereof. Compound alloys may also be used, such as CoMo sulfide, NiMo sulfide, Mn oxide/$SnO_2$, Co oxide/$SnO_2$, MoV mixed metal oxide (MMO), TeNb MMO, and W-doped MoVMn.

Figure 7:
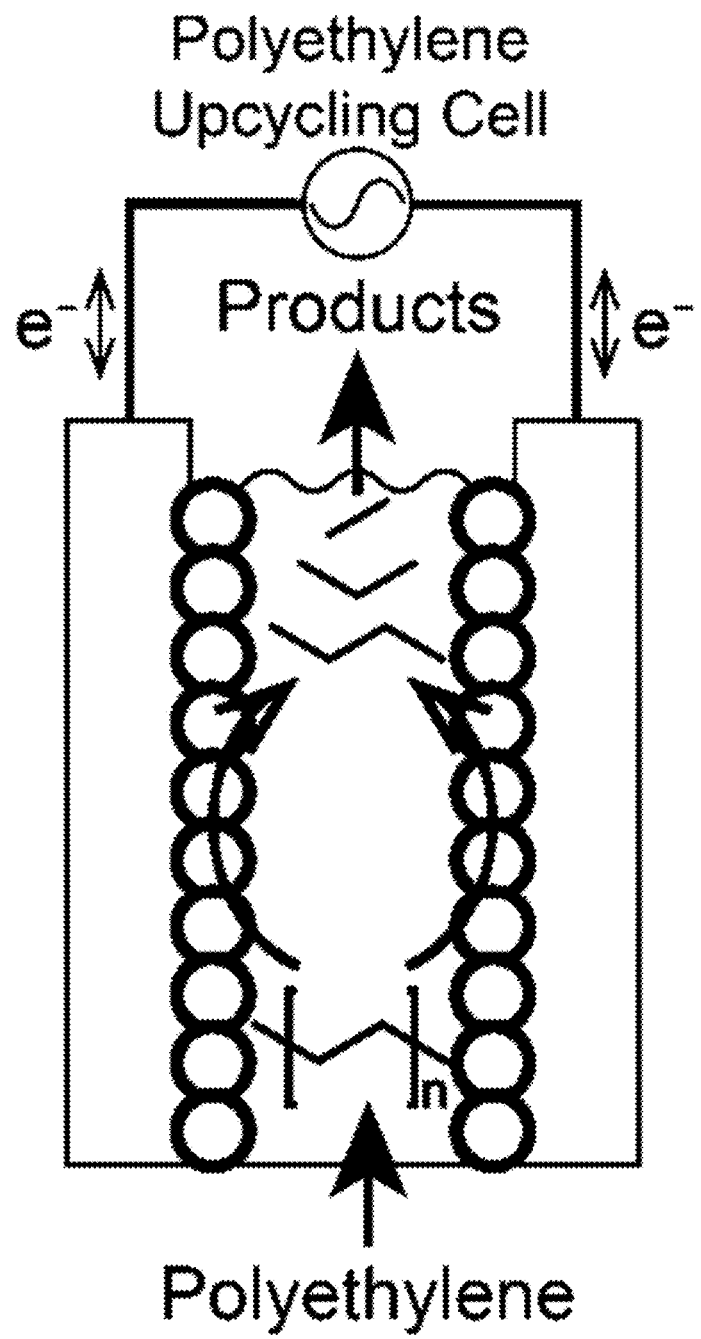
FIG. 7 is an illustration of an implementation of a polyethylene upcycling cell.

FIG. 7 is a schematic diagram of the overall process. Reactants ("polyethylene" being just a non-limiting example) enter from the bottom and are adsorbed to the electrocatalyst (circles), which is immobilized on one or more electrodes (vertical rectangles). The potential applied to the electrodes is then varied as disclosed herein to break C—C bonds within the reactant. The resulting products are then desorbed from the catalyst by again varying the potential as described herein.

Detailed Description

Figure 8:
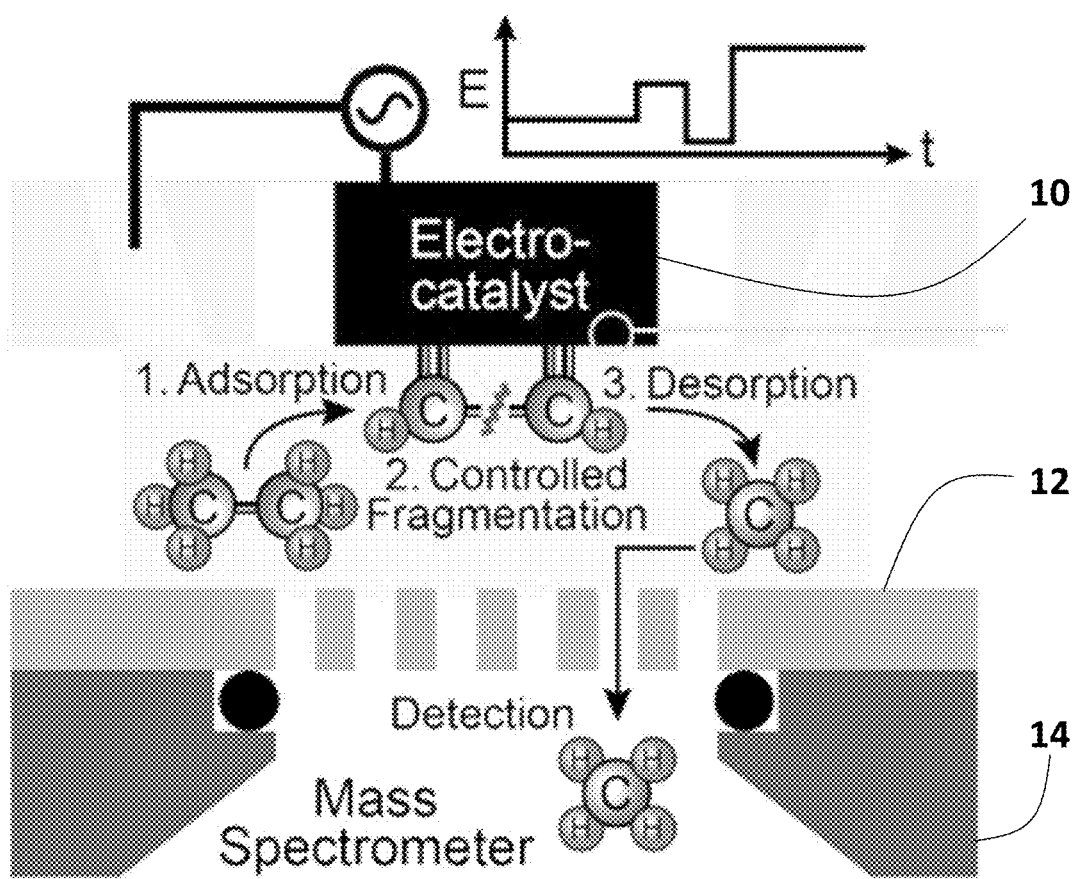
FIG. 8 is a schematic diagram of the electrochemistry-mass spectrometry (EC-MS) analysis method to perform stepwise analysis of C—C scission reactions.

FIG. 8 is a schematic of the EC-MS analysis method to perform stepwise analysis of C—C scission reactions and structure of the platinized Pt electrode. Here, the electrocatalyst 10 is placed in close proximity to the entry port 12 of a mass spectrometer 14. As shown in FIG. 8, the reaction then proceeds step-wise via: (1) adsorption of the reactant to the electrocatalyst 10; (2) controlled fragmentation of the reactant on the surface of the electrocatalyst 10; and then (3) desorption of the products from the surface of the electrocatalyst 10. The products are then directed to the entry port 12 of the mass spectrometer 14 for m/z analysis. Again, all three steps (adsorption, controlled fragmentation, and desorption) are controlled solely by varying the voltage applied to the electrocatalyst 10. The reaction is carried out, generally, at a temperature ranging from about 15° C. to about 30° C., and more preferably from about 15° C. to about 25° C.
Electrochemical Ethane Adsorption, C—C Scission, and Methane Desorption.

To probe the electrocatalytic transformation of C—C bonds in alkanes, we monitored the species generated at a Pt electrode upon electrochemical adsorption and transformation of ethane using EC-MS. Again, see FIG. 8. In EC-MS, an electrode-electrolyte interface 10 is brought into close contact with the inlet 12 of a mass-spectrometer 14, allowing for the real-time detection of desorbing products. 1 M $H_2SO_4$ was used as the electrolyte for all experiments and all potentials are reported vs the reversible hydrogen electrode (RHE). Any acidic electrolyte, without limitation, can be used. We employed a platinized Pt electrode with an electrochemical surface area (ECSA) of 49 $cm^2$ as determined by copper underpotential deposition (data not shown). Cyclic voltammetry of the Pt electrode showed a broad hydrogen underpotential deposition peak at 0.124 V, indicating no preferential facet formation (data not shown).

Figure 9:
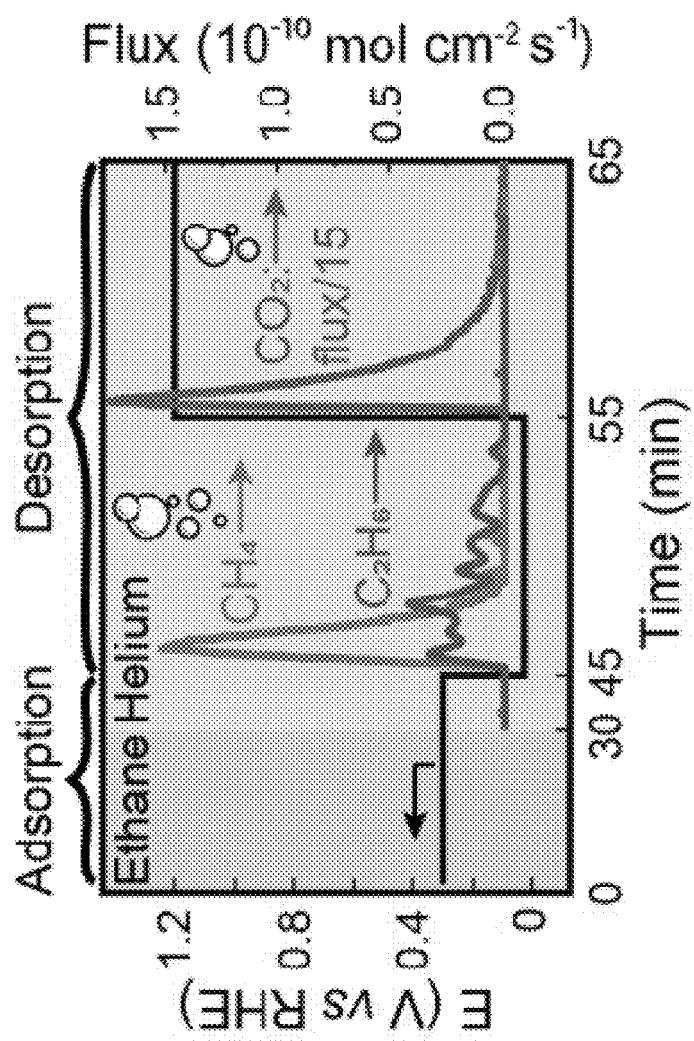
FIG. 9 is a graphic representation of an electrical potential program for 0.3 V adsorption of ethane, along with detected MS signals for methane, ethane, and $CO_2$ (divided by 15) during each step.

To investigate ethane transformation, we applied a time-dependent electrode potential while simultaneously changing the gases supplied to the electrode surface. Results and applied potential are shown in FIG. 9. Initially, we adsorbed ethane at 0.3 V for 30 min, followed by the removal of residual substrate with He at the same potential. We then changed the potential to a more reducing value (0.05 V) for 10 min to desorb surface-adsorbed alkyl intermediates through their hydrogenation to saturated hydrocarbons. Finally, we increased the electrode potential to 1.2 V to oxidize the remaining adsorbed carbonaceous species to $CO_2$.

After adsorbing ethane at 0.3 V, the reductive desorption of intermediates led to primarily methane being released (FIG. 9). The generation of methane from ethane at room temperature provides direct evidence of C—C splitting under mild conditions. This observation is remarkable as it indicates that dynamically changing the electrode potential at an electrocatalyst surface opens unique routes to alkane transformation. As such, it stands in contrast to classical thermocatalysis, where alkane fragmentation can only be promoted at high temperature. This reactivity, dependent solely on the potential applied to the electrocatalyst, allows for unprecedented control over the transformation of catalytic intermediates while they are bound to the catalytic surface.
Potential Dependence of Ethane Adsorption and C—C Scission.

Figures 10A, 10B:
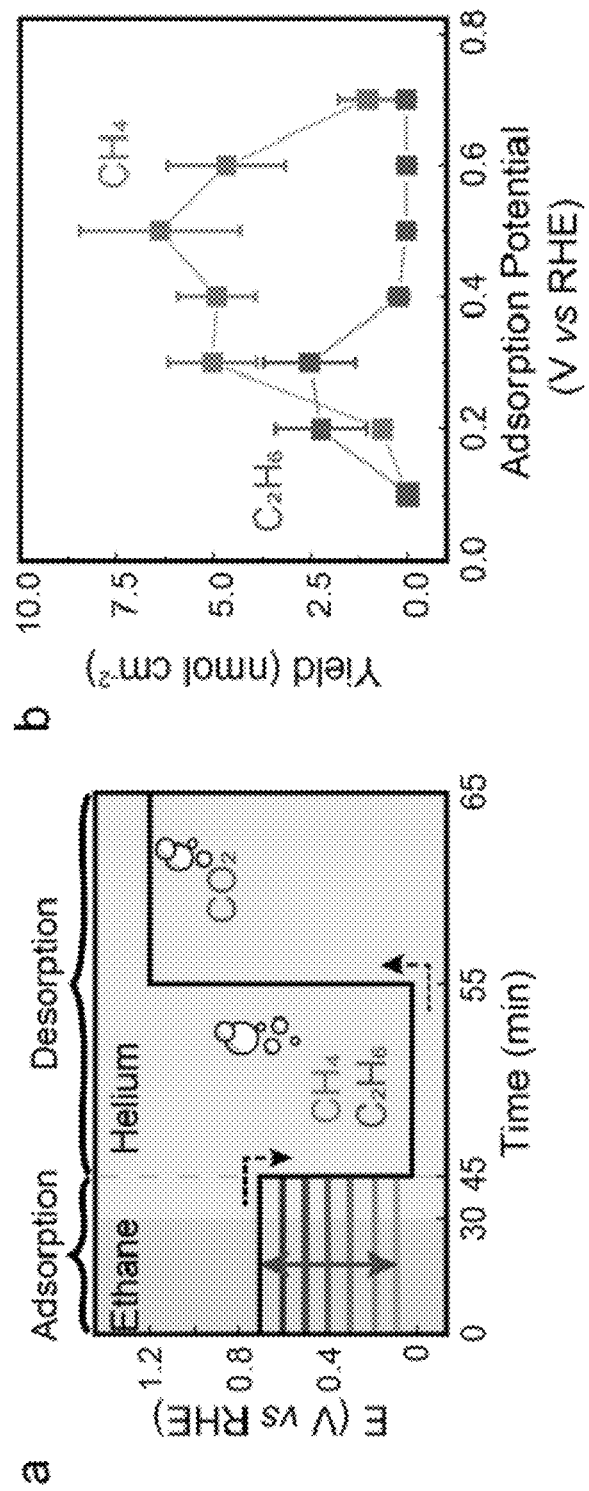
FIG. 10A is a graphical representation of an electrical potential program for 0.1-0.7 V adsorption of ethane.
FIG. 10B is a graph showing electrical potential-dependent yields of methane and ethane upon reductive desorption. Points are the average of at least three (3) trials and error bars indicate 1 standard deviation.

The amount of ethane adsorbed and the selectivity towards C—C bond fragmentation depend on the potential applied during adsorption. To investigate this effect, we varied the adsorption potential from 0.1 V to 0.7 V, while keeping all other parameters constant. See FIGS. 10A and 10B. FIG. 10A shows the potential program for 0.1-0.7 V adsorption of ethane. FIG. 10B shows the potential-dependent yields of methane and ethane upon reductive desorption.

Figure 14:
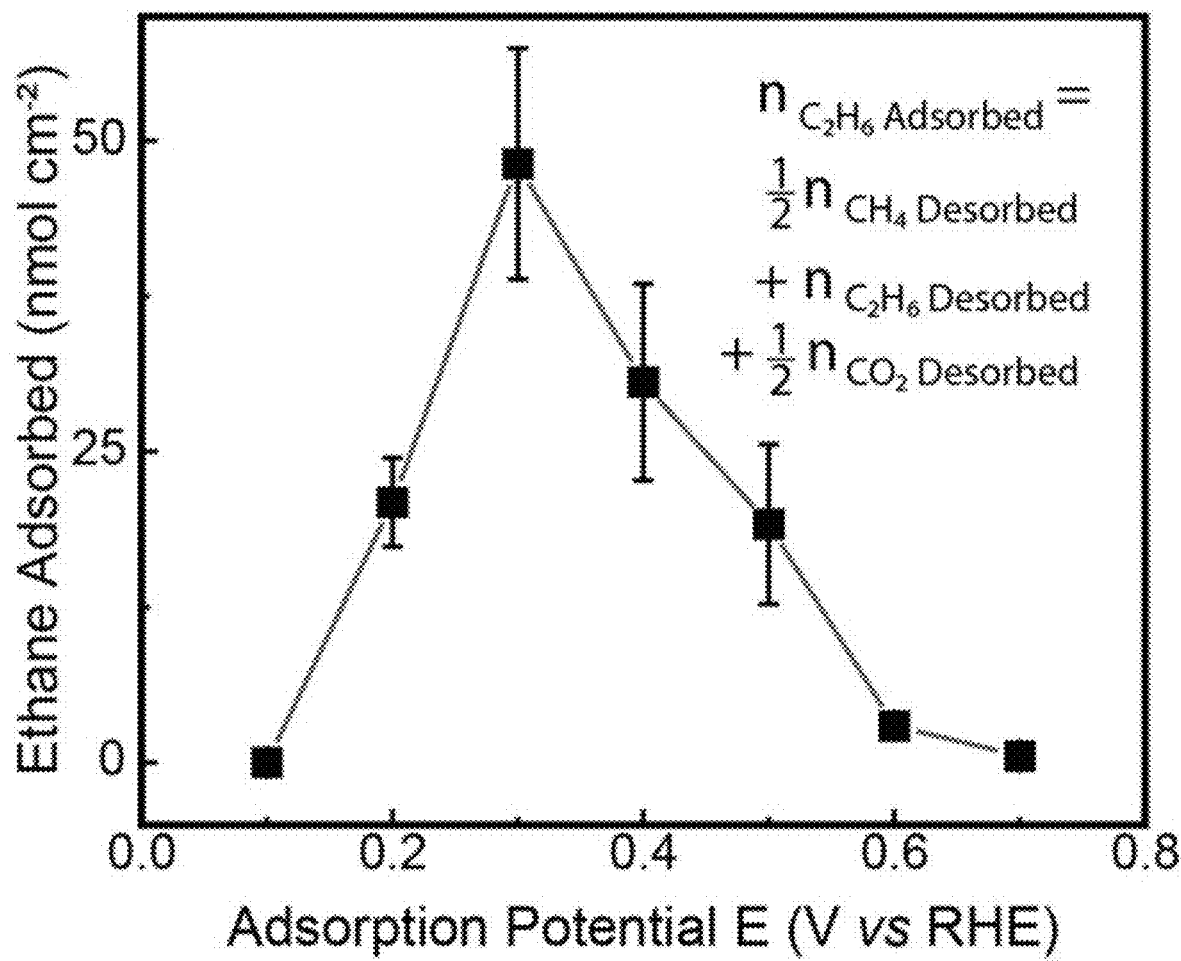
FIG. 14 is a graph depicting the dependence of ethane adsorption on the applied potential. The total amount of ethane adsorbed was calculated from the yield of methane, ethane, and $CO_2$ on the changes in voltage to 0.05 V and 1.2 V following a 30 min adsorption.

Ethane is only desorbed in appreciable quantities following adsorption at 0.2 and 0.3 V as seen in FIG. 10B. The yield of methane increases sharply from 0.2 to 0.3 V and remains approximately constant until dropping at 0.7 V, which is likely driven by low total adsorption (which is discussed further below with respect to FIG. 14). These data clearly indicate that C—C scission is promoted at potentials as low as 0.3 V. Moreover, the sharp increase in methane and decrease in ethane over a narrow potential range around 0.3 V points to a specific threshold potential necessary for C—C bond scission to occur.

Interestingly, not all adsorbates are released as ethane or methane. We observed the generation of a large amount of $CO_2$ upon applying an oxidizing potential after the reductive release of alkanes. This indicates that a portion of the adsorbates only allow for removal under strongly oxidizing conditions. Summing the carbon atoms in the released $CO_2$ and alkanes allowed us to calculate the total amount of adsorbed ethane, which reaches a maximum of 49 nmol $cm^{-2}$ at 0.3 V. See FIG. 14. The total adsorption of ethane decreases nearly symmetrically as the potential deviates from 0.3 V. At 0.1 and 0.7 V only trace ethane is adsorbed. This behavior agrees with previous voltammetric studies of ethane adsorption and can be understood by the thermodynamics of adsorption at electrified interfaces. See, for example, Cortright, R. D., Watwe, R. M., Spiewak, B. E. & Dumesic, J. A. Kinetics of ethane hydrogenolysis over supported platinum catalysts. *Catal. Today* 53, 395-406 (1999). Close to the potential of zero charge (PZC), where the interfacial drop in electrostatic potential is minimum, the interfacial concentration of neutral compounds is maximized, allowing their binding to the Pt surface. The PZC of polycrystalline Pt in $H_2SO_4$ is close to 0.3 V, consistent with the peak in adsorbed ethane.

Figure 15:
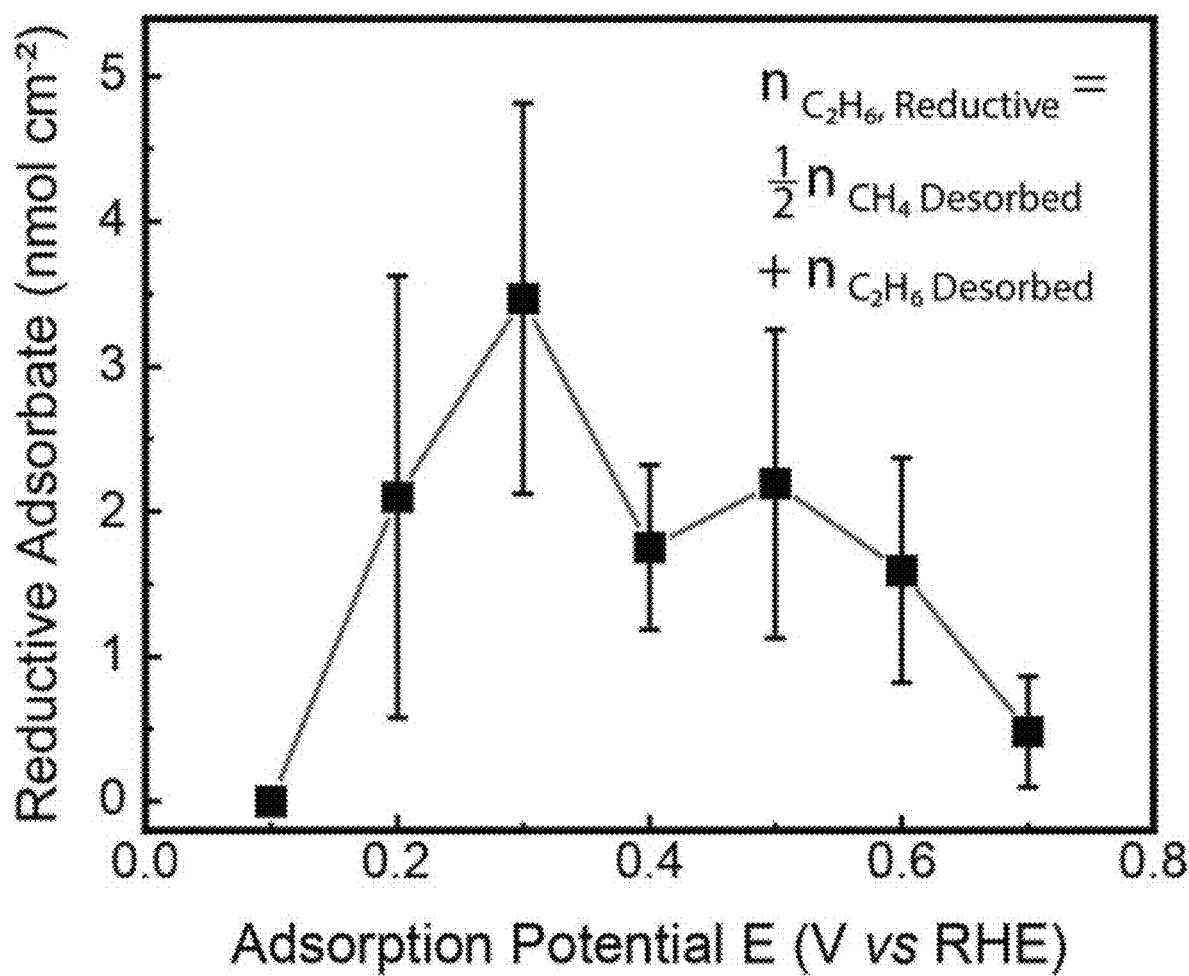
FIG. 15 is a graph depicting the dependence of the amount of reductively desorbable species on the adsorption potential following a 30 min adsorption.

The amount of released ethane and methane also reaches a maximum for adsorption at 0.3 V but does not exhibit a symmetric decrease at diverging potentials (FIG. 15). Instead, the amount of reductively desorbed carbon remains comparably constant between 0.4 and 0.6 V. The divergence between the trends in overall adsorption and in reductively desorbable species suggests that different intermediates are formed upon ethane adsorption, and only a subset leads to the release of alkanes. Most importantly, this raises the question of whether C—C bond fragmentation occurs upon adsorption, while alkanes are bound to the surface, or upon desorption.
Independent Control of C—C Scission.

Figure 11B:
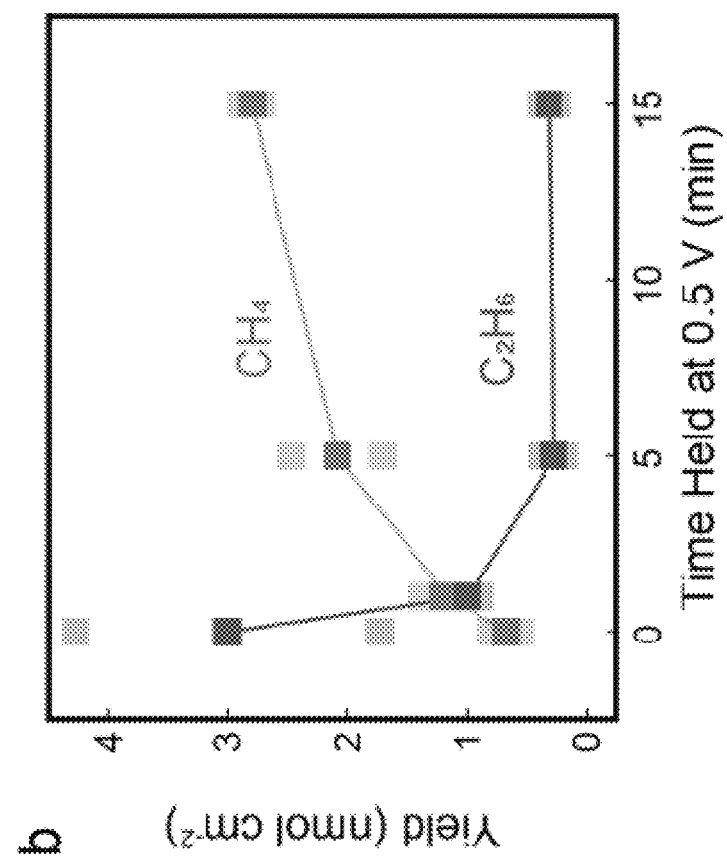
FIG. 11B is a graph depicting methane and ethane yields upon reductive desorption after holds at 0.5 V of varying lengths. The higher trace at right is for methane yield; the lower trace a right is for ethane yield.
Figure 11A:
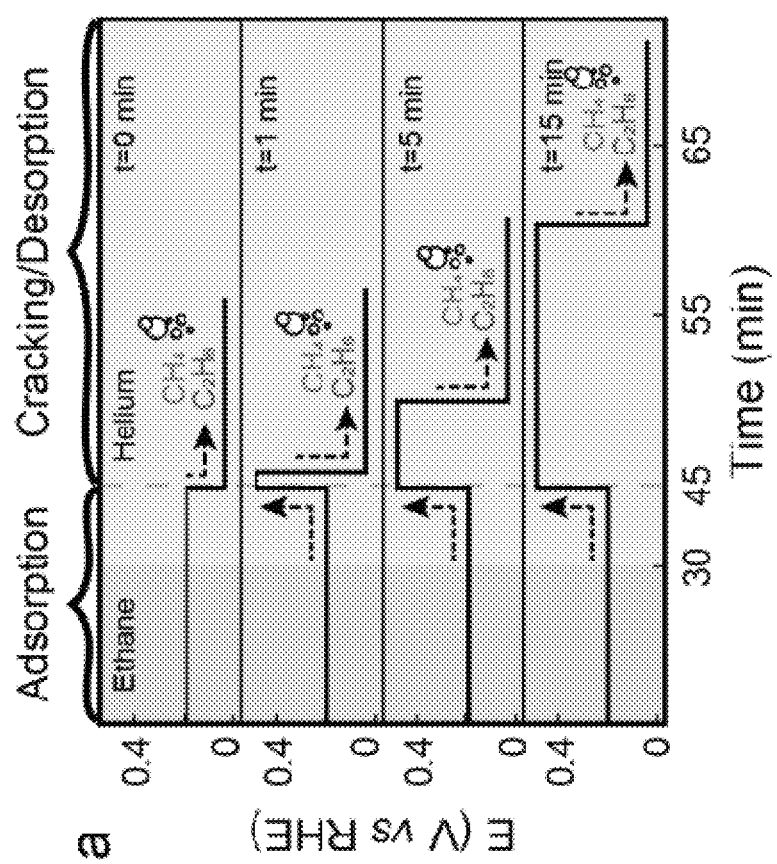
FIG. 11A is an electrical potential program for adsorption at 0.2 V followed by a step to 0.5 V for 0-15 min and subsequent reductive desorption at 0.05 V. The standard oxidative hold at 1.2 V was applied after the shown sequence to quantify remaining organic surface species.
Figure 16:
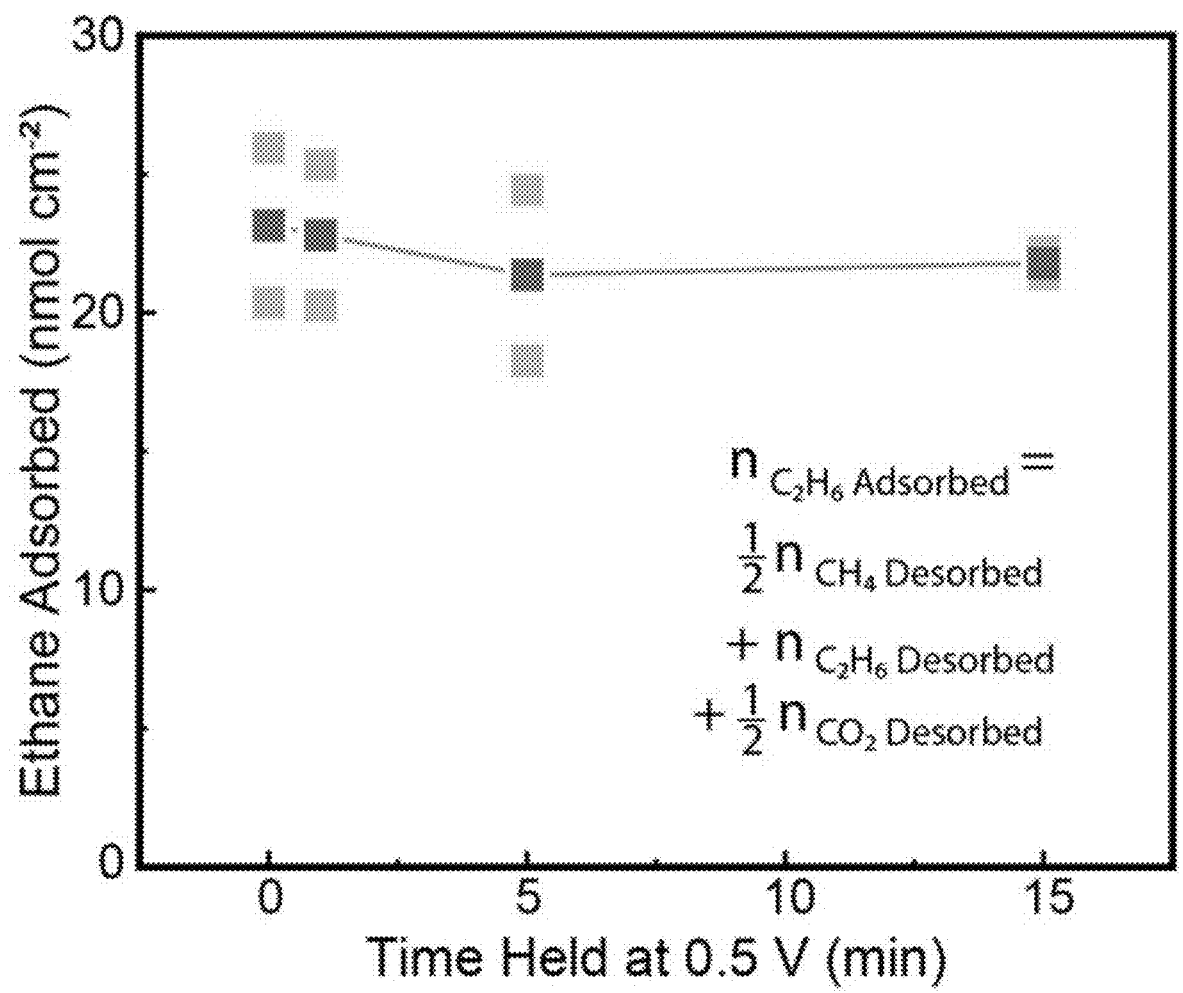
FIG. 16 is a graph depicting total ethane adsorption for the trials in which ethane is adsorbed at 0.2 V prior to stepping to 0.5 V for 0 to 15 min to facilitate cracking. The average adsorption was 4.46 nmol ethane with a standard deviation of 0.15 nmol. Lighter data points represent individual replicates, whereas darker data points indicate the average of both replicates.

We adapted the time-dependent potential applied to the electrode to determine the elementary step resulting in C—C scission by decoupling the adsorption and transformation steps. To do this, ethane was first adsorbed at 0.2 V, where it undergoes minimal fragmentation. Ethane was then expelled from the system with He and the potential was stepped to 0.5 V for 1 to 15 minutes to electrochemically promote the fragmentation of the pre-adsorbed species, as shown in FIG. 11A. The 0.5 V potential hold was followed by the standard reductive desorption at 0.05 V and oxidative desorption at 1.2 V. Measurements of the total adsorbed ethane for each experiment confirm consistent loading, allowing direct insight into the mechanism of C—C scission (FIG. 16).

FIG. 11A depicts the potential program for adsorption at 0.2 V followed by a step to 0.5 V for 0-15 min and subsequent reductive desorption at 0.05 V. The standard oxidative hold at 1.2 V was applied after the shown sequence to quantify remaining organic surface species. FIG. 11B presents methane and ethane yields upon reductive desorption after holds at 0.5 V of varying lengths.

Our data shows that the electrode potential controls C—C scission while ethane is bound to the surface. Upon increasing the potential from 0.2 to 0.5 V, we observed a decrease in ethane and an increase in methane yield (FIG. 11B). This behavior suggests a sequential mechanism for C—C cleavage, in which ethane adsorption and C—C bond breaking happen in distinct steps.

Figure 17:
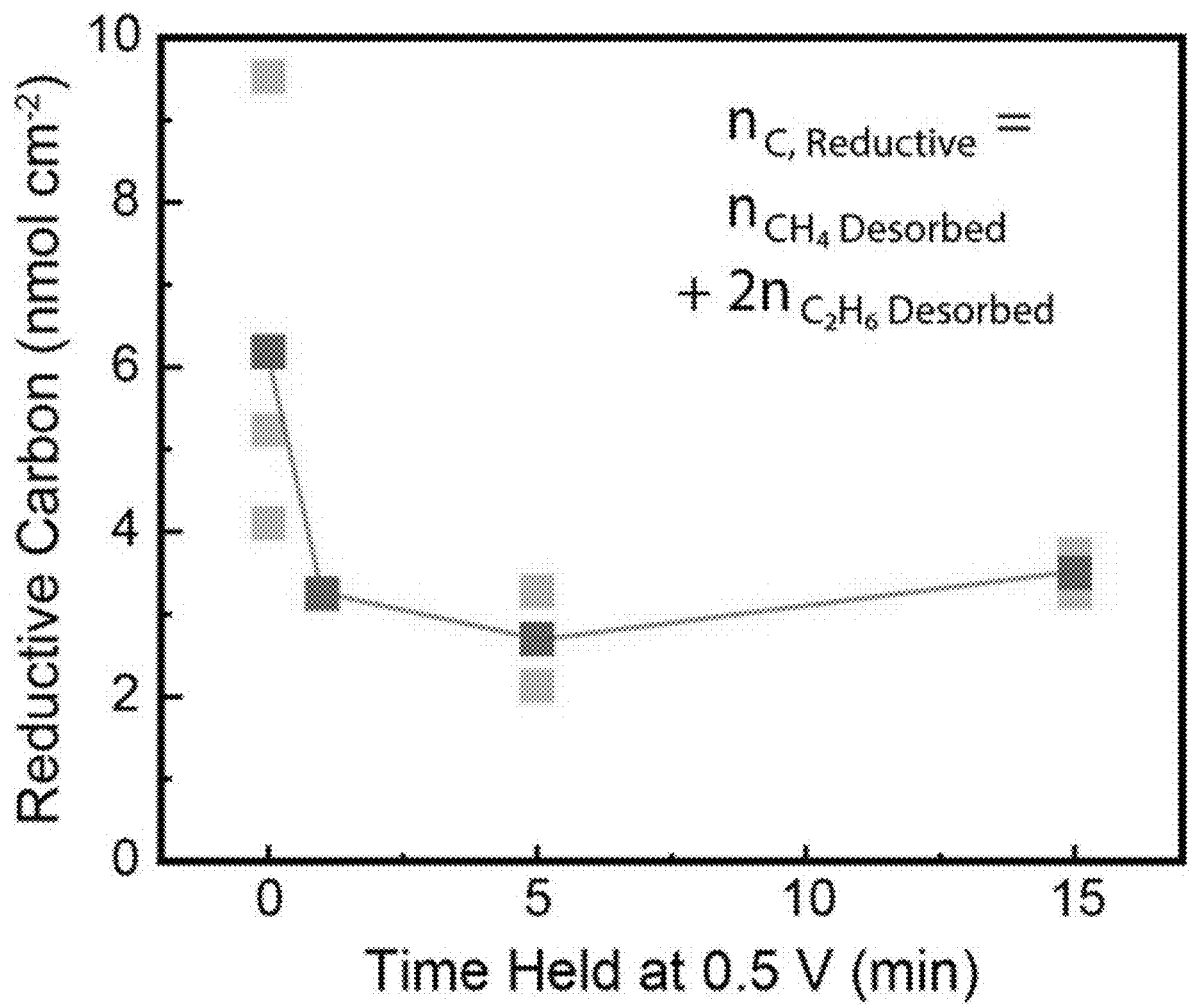
FIG. 17 is a graph depicting total reductive carbon atoms desorbed during the 0.05 V potential hold following adsorption at 0.2 V and a hold at 0.5 V for 0 to 15 min to facilitate fragmentation. Lighter data points represent individual replicates and darker data points indicate the average.

Varying the duration of the oxidative potential step provided additional insight into the kinetics of C—C scission. We found that the ethane yield decreased sharply within 1 minute and was reduced to trace amounts after 5 minutes. Simultaneously, the yield of methane increased. On average, the total amount of reductively desorbed carbon atoms showed a minimum at 5 minutes (FIG. 17), suggesting the formation of a non-desorbable intermediate involved in the C—C fragmentation step, as discussed below. We thus find that adsorption and fragmentation conditions can be independently controlled.

Potential-Controlled Fragmentation of Surface-Bound Ethane.

Figures 12A, 12B, 12C:
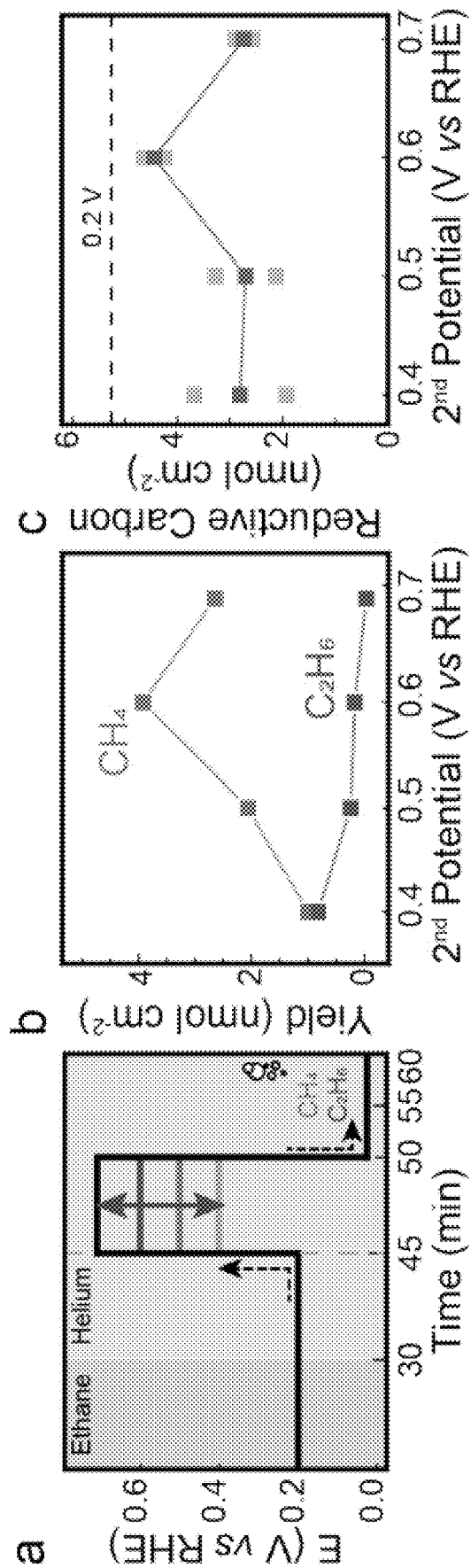
FIG. 12A is a schematic of the double potential program. The standard oxidative hold at 1.2 V was applied after the shown sequence to quantify remaining organic surface species.
FIG. 12B is a graph depicting yield of methane and ethane for the double potential experiments. The dashed line indicates the reductive carbon desorbed after adsorption at 0.2 V in the absence of a second potential hold. Data corresponds to the average of two replicates and the raw data is shown in FIG. 20.
FIG. 12C is a graph depicting yield of reductively desorbed carbon for the double potential experiments. The lighter points represent individual trials and the darker points are the corresponding average values.
Figure 20:
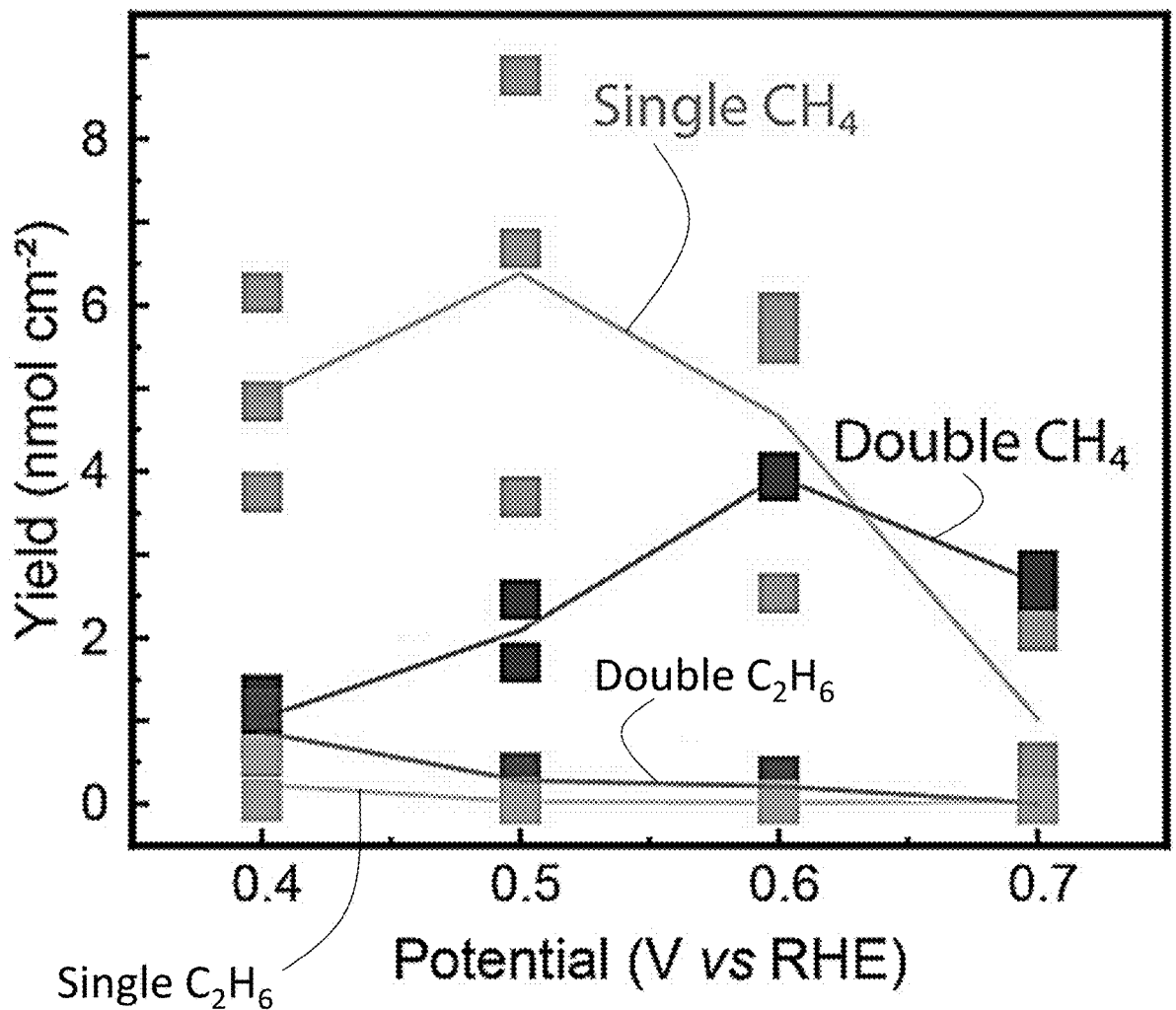
FIG. 20 is a graph depicting yields of methane, ethane, and $CO_2$ corresponding to FIG. 12A compared to those from FIG. 10A. Datapoints indicate values from individual replicates while the lines track the average of each replicate. Lighter data points at the top of the graph represent single-potential methane. Darker data points in the middle of the graph represent double-potential methane. As noted in the figure, the two lower traces represent single-potential ethane and double-potential ethane.
Figure 21:
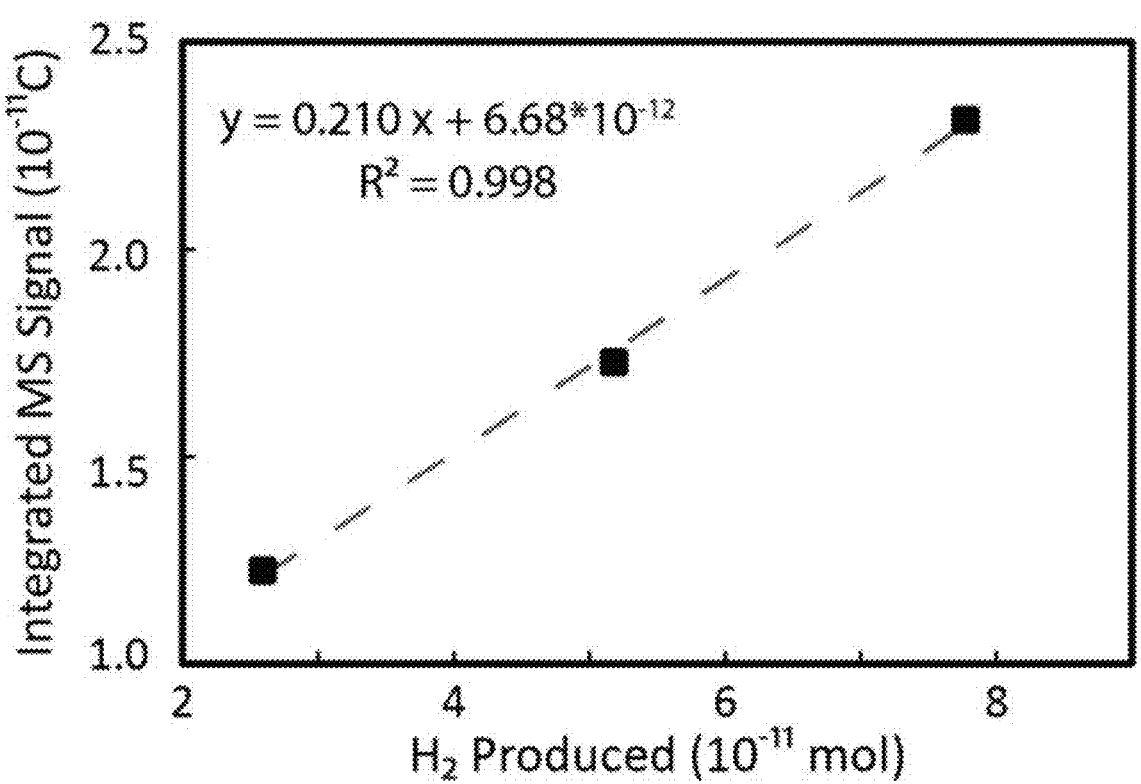
FIG. 21 is a graph depicting internal HER calibration of the EC-MS used in the examples and the corresponding linear fit.

The finding that adsorption and C—C fragmentation each display a unique potential dependence opens the door to electrochemically control the fragmentation of intermediates while they are bound to the surface. To verify this premise, we adsorbed ethane at 0.2 V, where it undergoes minimal fragmentation, and subsequently applied varying oxidative potentials for 5 min prior to desorption. See FIGS. 12A, 12B, and 12C. FIG. 12A is a schematic of the double potential program. The standard oxidative hold at 1.2 V was applied after the shown sequence to quantify remaining organic surface species. FIG. 12B presents yield of methane and ethane for the double potential experiments. The dashed line indicates the reductive carbon desorbed after adsorption at 0.2 V in the absence of a second potential hold. Data corresponds to the average of two replicates and the raw data is shown in FIG. 20. FIG. 12C presents the yield of reductively desorbed carbon for the double potential experiments. The lighter points represent individual trials and the darker points are the corresponding average values.

Figure 18:
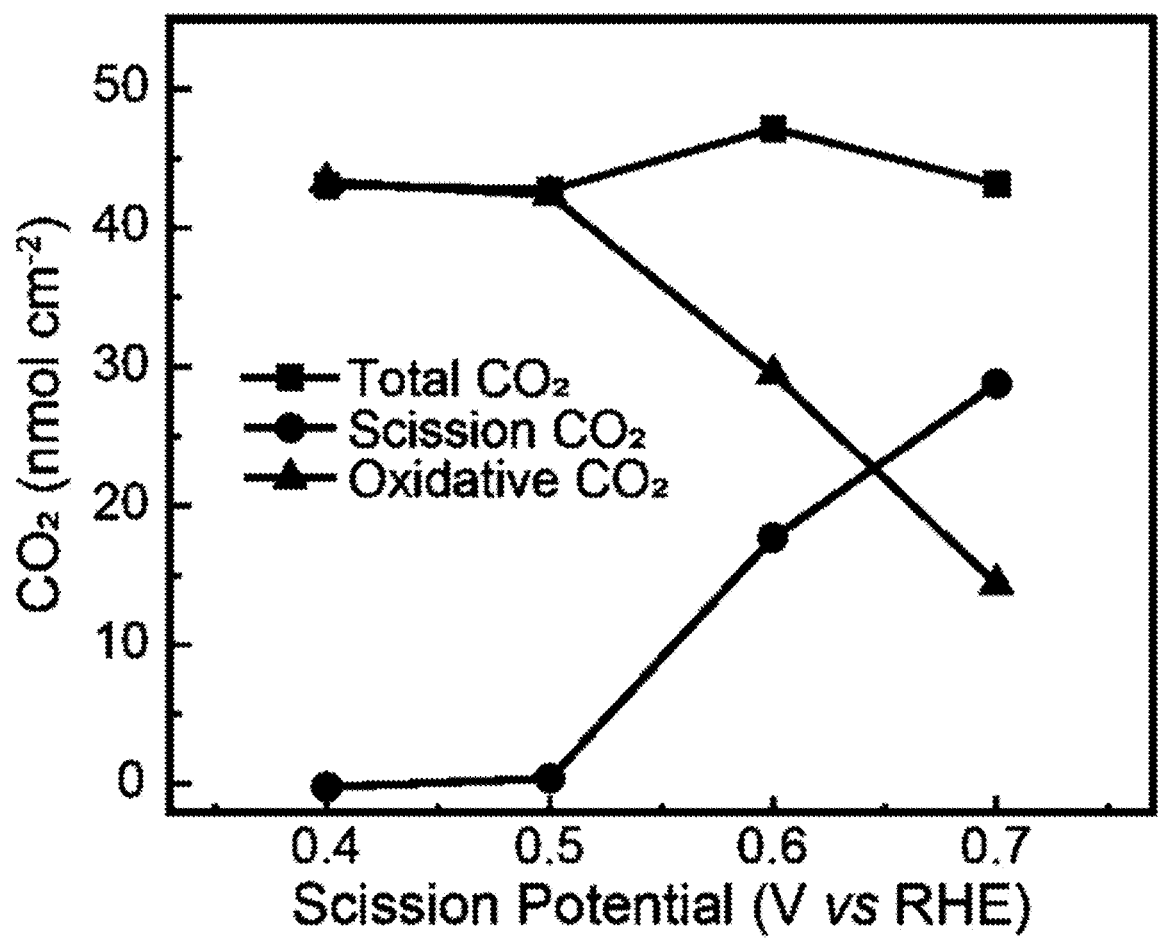
FIG. 18 is a graph depicting $CO_2$ produced during the 5-min scission potential hold (0.4 to 0.7 V) and oxidative desorption potential hold (1.2 V) following ethane adsorption at 0.2 V for 30 min. Points represent the average of two (2) trials. (-■-)=total CO2; (-●-)=scission $CO_2$; (-▲-)=oxidative $CO_2$.

Our data show that increasing the oxidative potential from 0.4 to 0.6 V leads to an increase in methane formation with maximum methane observed at 0.6 V, while the ethane yield simultaneously decreased. At 0.7 V, methane generation decreased, coinciding with measurable $CO_2$ generation during the second applied potential (data not shown). We therefore ascribe this decrease to the competitive oxidation of adsorbed alkanes at highly oxidizing potentials, which was also observed to a lesser extent at 0.6 V. See FIG. 18. The ability to control the amount and selectivity of alkanes released by applying specific electrode potentials to alkane-covered electrodes highlights the unique role electrode potentials play in controlling the stability of the C—C bond in intermediates while they are bound to the electrode surface. This degree of control is unique to electrochemical reactivity and opens novel avenues for operating and controlling alkane transformation reactions at room temperature.

Figure 19:
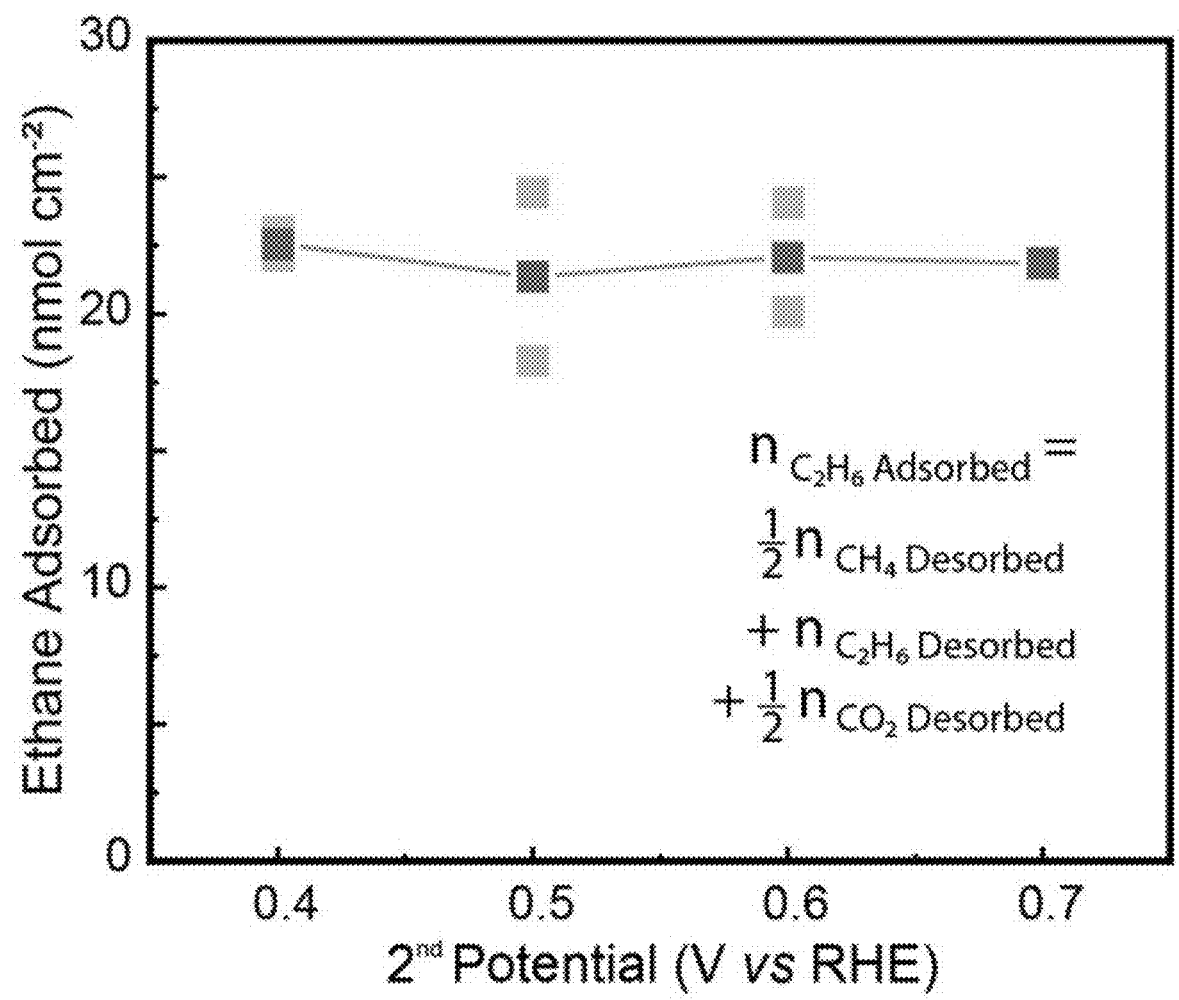
FIG. 19 is a graph depicting total ethane adsorption for the trials in which ethane is adsorbed at 0.2 V prior to stepping to more oxidative potentials for 5 min to facilitate cracking. Lighter data points represent individual replicates; darker data points indicate the average of both replicates.

For example, separating the adsorption of ethane from its transformation allows us to individually tune the specific operating conditions of each elementary step involved in C—C bond fragmentation. This is evidenced by the fact that, despite $CO_2$ generation, applying 0.7 V to pre-adsorbed ethane led to 2.6 times more methane than when carrying out both adsorption and C—C cleavage at 0.7 V. The higher yields are a result of overcoming adsorption limitations by loading substrate on the electrode before leveraging the favorable C—C bond cleavage at 0.7 V (FIG. 19). We expect that further tuning the potential and duration of the adsorption and scission steps would allow optimization of methane yield and selectivity. Importantly, these findings further demonstrate that manipulation of the electrode potential affords precise control over individual steps of the catalytic surface chemistry after the adsorption of substrates. The strong potential dependence of C—C fragmentation raises the question as to how electrode potentials promote room-temperature C—C bond fragmentation on the Pt surface.

Proposed Mechanism of C—C Fragmentation.

Figure 13:
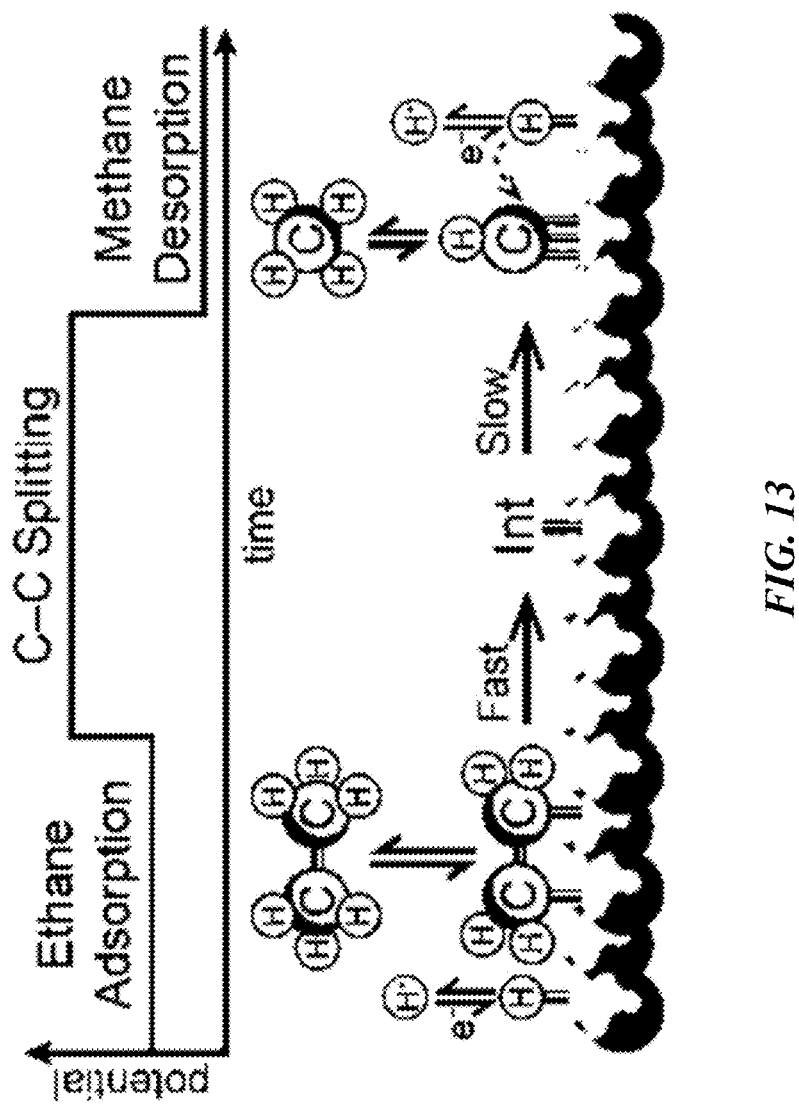
FIG. 13 is a schematic diagram of a hypothesized (non-limiting) mechanism wherein the adsorbed ethane is rapidly converted to an active intermediate upon applying an oxidative potential. The intermediate undergoes a slow cleavage step to produce fragments that are reductively desorbed as methane.

Without being limited to any specific mechanism of action, we gained insight into the mechanism of C—C cleavage using the potential-dependent yields of methane, ethane, and $CO_2$. When observing the potential-dependent fragmentation of pre-adsorbed ethane, we found no stoichiometric correspondence between the disappearance of ethane and the generation of methane. We quantified the amount of carbon released after adsorbing ethane at 0.2 V and compared this value to the carbon reductively desorbed after applying varying oxidative potentials to the pre-adsorbed ethane. Interestingly, the amount of carbon desorbed in the form of methane and ethane was substantially decreased after subjecting the electrode to 0.4 and 0.5 V, but increased again to near the initial amount when applying 0.6 V. See FIG. 12C. Based on these findings, we theorize that C—C bond fragmentation initially involves the generation of a reductively non-desorbable surface intermediate. This is shown schematically in FIG. 13. In a subsequent step, this intermediate undergoes cracking to produce $C_1$ fragments. Both steps are potential dependent, but the generation of the intermediate appears to occur at a faster rate than the C—C fragmentation event, explaining the transient decrease in the amount of total desorbable carbon. At 0.7 V, the total amount of desorbed carbon decreases, which is attributed to the generation of $CO_2$. See FIG. 18. Our observations are consistent with the prevailing mechanistic hypothesis of thermal hydrogenolysis, which suggests that C—C bond cleavage requires the formation of a dehydrogenated intermediate which subsequently undergoes fragmentation. See Almithn, A. & Hibbitts, D. Comparing Rate and Mechanism of Ethane Hydrogenolysis on Transition-Metal Catalysts. *J. Phys. Chem. C* 123, 5421-5432 (2019). While the intermediate in the proposed pathway is consistent with this idea, alternative mechanisms including an overall oxidation reaction remain possible. Further mechanistic investigation will be necessary to understand how the electrode potential controls the formation and transformation of the proposed intermediates.

Transitioning to a sustainable chemical industry requires the development of new approaches to critical reactions, such as the activation of inert $C(sp^3)$—$C(sp^3)$ and $C(sp^3)$—H bonds in alkanes. These reactions are central to chemical plastics recycling and petrochemical processing. Here, we demonstrate an electrocatalytic method to cleave the C—C bond in ethane at room temperature. Using time-dependent electrode potential sequences, combined with monolayer-sensitive in-situ analysis, we gained independent control over ethane adsorption, C—C bond fragmentation, and methane desorption. Importantly, our approach allowed us to use variations in the electrode potential to promote the scission of ethane while it is bound to the catalyst surface, resulting in unprecedented control over the selectivity of this alkane transformation reaction.

Steering the transformation of intermediates after their adsorption to the catalyst constitutes a missing lever of control in catalysis, which presently is only achieved through the manipulation of individual molecules using scanning tunneling microscopes. See, for example, Imada, H. et al. Real-space investigation of energy transfer in heterogeneous molecular dimers. *Nature* 538, 364-367 (2016). Achieving this degree of control for the example of C—C fragmentation allows us to envision fundamentally novel reaction paradigms, where reactions incorporating multiple branchpoints are rationally directed towards the desired outcome through real-time control of the electrode potential. The method breaks the paradigm that properties of a catalyst material need to simultaneously satisfy the thermodynamic requirements of adsorption and desorption as well as the transformation of adsorbed substrates and thereby substantially widens the parameter space for catalytic reaction engineering.

Enabled by these new reaction paradigms, the reactivity observed herein opens the door to the electricity-driven transformation of $C(sp^3)$—$C(sp^3)$ and $C(sp^3)$—H bonds in alkanes at room temperature, thereby laying the groundwork for a sustainable chemical industry of the future.

EXAMPLES

The following examples are included solely to provide a more complete disclosure of the method described and claimed herein. The examples are not intended to limit the scope of the claims in any fashion.

In a non-limiting embodiment, the method entails the transformation of alkanes at room temperature using renewable electricity as a driving force. Since it electrifies a central transformation in the chemical industry, its applications are numerous, and the following list is non-exhaustive.

We envision this innovation being applied to mediate the cracking of short alkanes, with specific application to the regeneration of chemical feedstocks from waste plastic.

Applications of the C—C bond scission element of the invention involve the cracking of short- and long-chain alkanes such as, but not limited to, $C_2$ to $C_{24}$ linear, branched, and cyclic alkanes, such as ethane, propane, propylene, butane, butylene, octane, cyclohexane, cyclooctane, etc. to produce shortened products, such as, but not limited to, methane, ethane, propane, and butane.

Figures 4A, 4B:
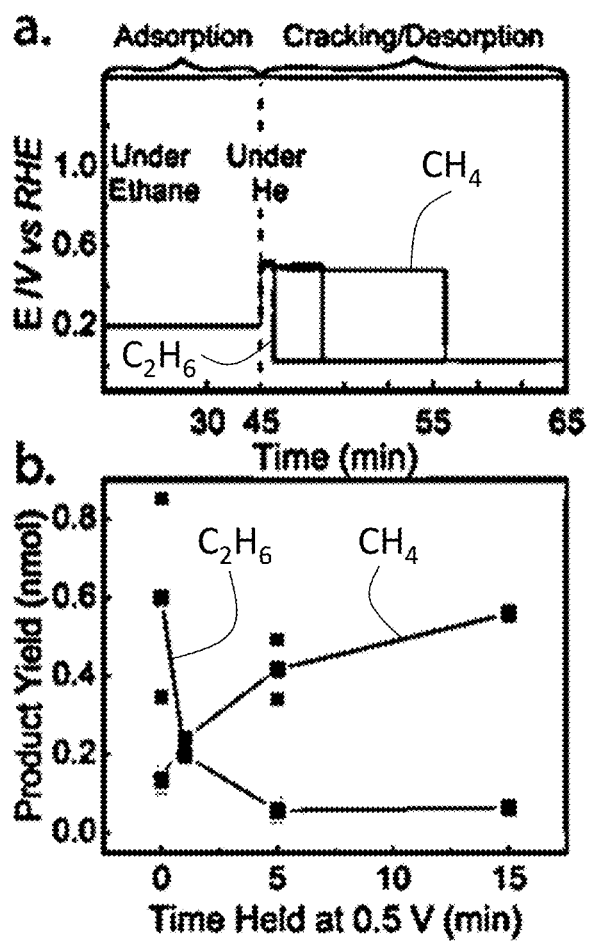
FIG. 4A is an illustration of a potential program involving ethane adsorption at +0.2 V vs RHE followed by displacing ethane with He and subsequently stepping to 0.5 V vs RHE for 1-15 minutes and lastly stepping reductively to desorb products.
FIG. 4B is a graph demonstrating $CH_4$ and $C_2H_6$ desorption upon the reductive step detailed in FIG. 4A. The measurements indicate a sequential mechanism of ethane cracking involving discrete adsorption, C—C breaking, and desorption steps.

An example of the application and implementation of the plastics upcycling element of the invention is the production of ethylene, propylene, butylene, and other short olefins, as well as methane, ethane, propane, butane and other short paraffins from plastics such as low- or high-density polyethylene (LDPE and HDPE), with potential for application to traditionally unrecyclable plastics such as polyvinyl chloride (PVC) and polystyrene (PS). This will be accomplished by designing an electrochemical cell consisting of two identical electrodes made from platinum particles deposited on high surface area conductive carbon supports (FIG. 4).

An alternating potential on the range of 0.001-10,000 Hz will be applied between the two electrodes. Thereby, each electrode will rapidly transition between alkane adsorption, C—C bond breaking, C—C bond dehydrogenation, and desorption potentials. The cyclic process can be brought to scale using electrochemical flow reactors, which are an area of active advancement in pharmaceutical manufacturing.

Preparation of Platinized Pt Catalyst.

A platinum stub (99.995%, Pine Instruments, Grove City, Pennsylvania) was polished to a mirror finish using alumina (0.3-0.05 μm diameter, Allied High Tech, Rancho Dominguez, California) and sonicated in Milli-Q water twice for 15 min each. The polished stub was plated with nanoporous Pt using a chronopotentiometric approach. Using a method from literature, a solution of $H_2PtCl_6$ (0.072 mol $L^{-1}$, 99.9% trace metals basis, Sigma Aldrich, St. Louis, Missouri) and 0.13 mmol $L^{-1}$ $Pb(C_2H_3O_2)_2$ (99.999% trace metals basis, Sigma Aldrich) in Milli-Q $H_2O$ (>18.2 MΩ) was used to deposit Pt on the stub upon an application of 10 mA/cm² for 10 min.(1) The deposition was performed using Pt wire (99.999%, Sigma Aldrich) as the counter electrode. Residual Pt ions were removed from the electrode by dipping the active surface in Milli-Q water several times before use.

Characterization of Platinized Pt Catalyst.

Zeiss LEO 1530 and Zeiss Gemini 450 scanning electron microscopes (SEMs) (Carl Zeiss Microscopy, LLC; White Plains, New York) were employed for measuring the morphology of the platinized electrodes. The images were acquired under an acceleration voltage of 3 kV using the in-lens detector. SEM revealed a highly roughened nanoporous Pt surface. (Data not shown).

The electrochemical surface area (ECSA) was measured using a literature method described in A. M. Feltham, M. Spiro (1971) "Platinized platinum electrodes," *Chem. Rev.* 71: 177-193.

The underpotential deposition of a Cu monolayer at 0.2 V (Ag/AgCl NaCl 3 mol $L^{-1}$) was performed for 3 min using 5 mol $L^{-1}$ $CuSO_4$ (ACS Reagent, Sigma Aldrich) in 0.1 mol $L^{-1}$ $HClO_4$ (ACS Reagent, Sigma Aldrich). This was followed by oxidation using linear sweep voltammetry at 100 mV $s^{-1}$ to 1.2 V (RHE). The background-subtracted oxidation currents were integrated to yield the passed charge, which was related to surface area using a conversion factor of 420 μC $cm^{-2}$. The platinized Pt electrodes had an ECSA of 48.9 cm²±1.7 cm² giving an average roughness factor of 249.3±8.5. See Table 1.

TABLE 1

The ECSA and corresponding roughness factors of the prepared electrocatalyst based on measurements using Cu-UPD of three samples along with the average and standard deviation.

| Replicate | ECSA (cm²) | Roughness Factor |
|---|---|---|
| 1 | 50.4 | 257 |
| 2 | 48.8 | 254 |
| 3 | 46.6 | 237 |
| Average | 49.0 ± 1.7 | 249 ± 8.5 |

Electrochemical Measurements.

All electrochemical measurements were performed using a Biologic SP-200 potentiostat controlled with EC-lab software. All potentials are reported vs RHE unless otherwise stated. To improve the measurement stability, a 100Ω resistor was connected in series with the working electrode. A platinized Pt surface was freshly prepared for each experiment. An Ag/AgCl 13 mol L$^{-1}$ KCl electrode (BASi Research Products, West Lafayette, Indiana) was used as the reference electrode and a platinum wire, cleaned by bringing to white glow in the flame of a butane torch, was used as the counter electrode. To compensate for the solution resistance, 85% software-based impedance measurement technique (ZIR) was used.

$H_2SO_4$ (1 M, ACS Reagent Grade; Avantor Inc., Radnor, Pennsylvania) was used as the electrolyte and was degassed with He (UHP grade 5.0, Airgas USA LLC, Radnor Pennsylvania) sparging for 15 min prior to injection into the EC cell. The cell was cleaned with piranha (85% $H_2SO_4$, 15% $H_2O_2$), rinsed with Milli-Q water, and dried with compressed air prior to each experiment. A pH of about 0 to about 2 is most preferred. A pH of about zero (0) is easily achieved using an electrolyte comprising about 1 M of any strong acid—HCl, HBr, HI, $H_2SO_4$, $HNO_3$, $HClO_3$, $HClO_4$, or any combination of these.

EC-MS experiments consisted of a series of constant potential holds to sequentially adsorb, transform, and desorb species. The adsorption step always consisted of a 30 min hold at the given potential under ethane (Research Grade, Airgas) followed by a 15 min He flow to remove residual substrate at the same potential. A gas flow rate of 10 mL min$^{-1}$ He was used for 14 minutes following the adsorption of ethane before being reduced to 1 mL min$^{-1}$ for 1 min prior to desorption. All other steps were run at a constant gas flow rate of 1 mL min$^{-1}$. Following the adsorption and He flow, some experiments contained a transformation step at a different potential prior to desorption. The desorption was done in two steps. First species that could be reductively desorbed as alkanes were removed by a 10 min potential hold at 0.05 V. Subsequently, the remaining organic adsorbates were removed by complete oxidation to $CO_2$ through a hold at 1.2 V for 10 min. All experiments included two blank cycles performed completely under He prior to the cycle using ethane to account for organic impurities that were not removed in the cleaning procedures.

Quantification of MS Data: EC-MS Calibration.

All experiments were performed using a commercial EC-MS system (SpectroInlets brand; København, Denmark) running with Zilien-brand software (SpectroInlets). The electrochemical experiments were performed in a Kel-F EC-cell mounted onto a semipermeable membrane chip interfaced with the MS to allow products to diffuse through the chip and into the analysis chamber.

To quantify the products generated during EC-MS experiments, a two-part calibration was needed. In a first step, an internal calibration was performed using hydrogen to relate the MS signal to a known production rate. The working principle of the EC-MS dictates a 100% collection efficiency of products generated at the electrode surface. This allowed quantification using a 100% faradaic efficiency hydrogen evolution reaction to correlate MS signal with the flux of hydrogen. See D. B. Trimarco, S. B. Scott, A. H. Thilsted, J. Y. Pan, T. Pedersen, O. Hansen, I. Chorkendorff, P. C. K. Vesborg (2018) "Enabling real-time detection of electrochemical desorption phenomena with sub-monolayer sensitivity," *Electrochim. Acta.* 268: 520-530. To perform the calibration, a polished Pt electrode was held at constant reductive current until the m/z=2 signal stabilized, indicating that the hydrogen production rate was equal to the hydrogen flux to the MS. The resulting signal-$H_2$ production data was fit using a linear regression to generate an internal hydrogen calibration curve. (Data not shown.)

Internal calibration is only possible for gases that can be produced with 100% faradaic efficiency, while other gases must be quantified using an external calibration curve. External calibrations were performed by flowing gases with a known concentration of analyte as the system carrier gas and measuring the corresponding MS signals. Dilutions of the pure analyte gases with He were done using a series of six mass flow controllers (Alicat Scientific, Tucson, Arizona) to obtain relevant concentrations. The collection efficiency from the carrier gas was determined using an external hydrogen calibration. The resulting steady state $H_2$ signals were subjected to the internal HER calibration's linear fit to generate $H_2$ flux vs gas concentration data in the dilute regime. Assuming that the flux of carrier gas is constant in this regime to within 0.5 mol %, allowed calculation of the total flux of gas through the chip capillary using the following equation:

$$He \text{ flux into } MS = \frac{(H_2 \text{ signal} - b)/m}{x_{H_2}}$$

where b is the internal HER calibration fit's intercept, m is its slope, and $x_{H_2}$ is the mol % of $H_2$.

Figure 22:
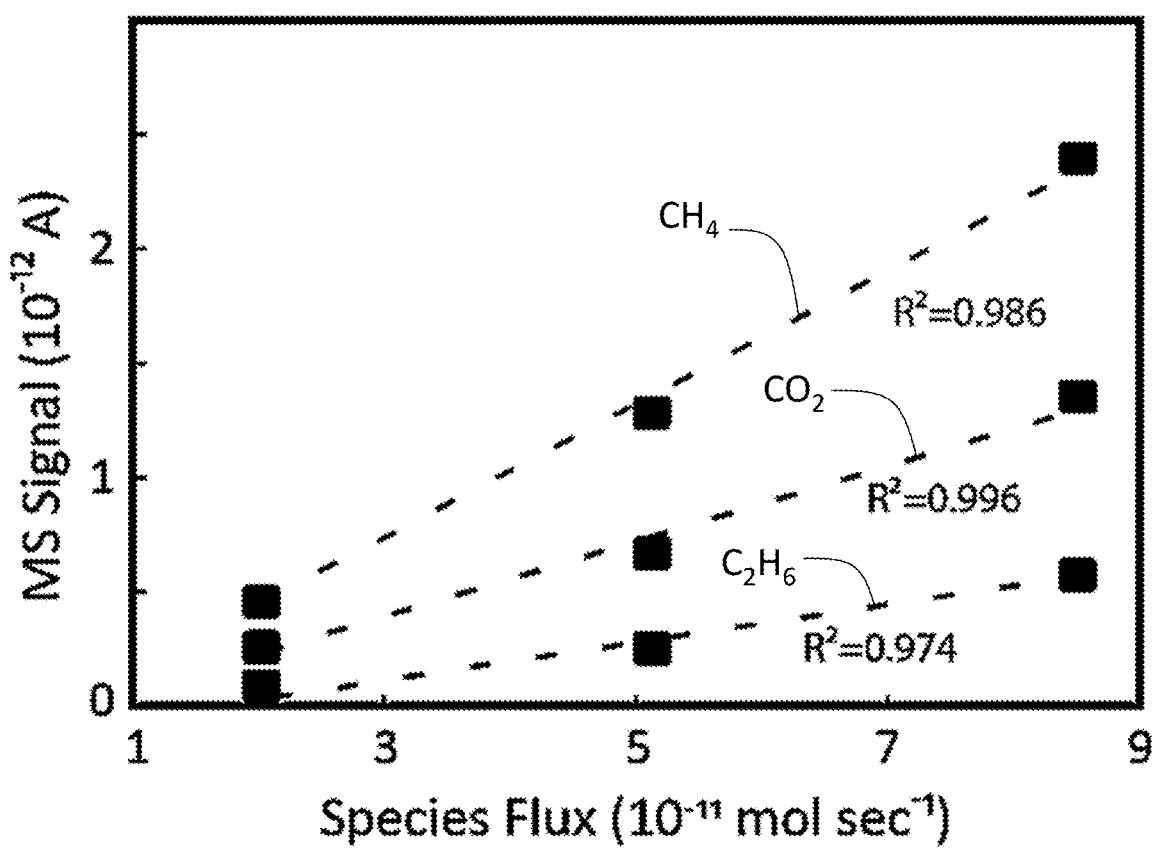
FIG. 22 is a graph depicting external calibration curves for methane (top trace), ethane (bottom trace), and $CO_2$ (middle trace) based on the calculated gas flux in the capillary using an external hydrogen calibration.

Assuming constant carrier gas flux, the flux of analyte through the capillary and into the MS was calculated for other species to obtain calibration curves as shown in FIG. 22 and Table 2. Hydrogen, methane, ethane, and $CO_2$ were calibrated to the m/z 2, 15, 30, and 44 signals respectively.

TABLE 2

Calibration curves to quantify $H_2$, $CH_4$, $C_2H_6$, and $CO_2$ from MS data, based on the internal HER calibration and external calibrations for the other species.

| Species | Corresponding MS Signal (m/z) | Fit Equation |
|---|---|---|
| $H_2$ | 2 | y = 2.0994E−10x + 6.6790E−12 |
| $CH_4$ | 15 | y = 4.5354E−11x − 3.3885E−13 |
| $CO_2$ | 44 | y = 7.9954E−11x − 4.9746E−13 |
| $C_2H_6$ | 30 | y = 2.0122E−11x − 2.3776E−13 |

Quantification of MS Data: Deconvolution of MS Signals.

Common fragments for methane and ethane present challenges in the speciation and quantification of these signals. Specifically, $CH_4$ and $C_2H_6$ both have a strong m/z 15 signal. It is therefore necessary to deconvolute this signal prior to methane quantification by removing the contributions from $C_2H_6$ production. To do this, a ratio was established between the m/z=15 and 30 signals arising from ethane. This linear fit was applied to the measured m/z 15 signal to account for the portion due to ethane.

$$15_{CH_4} = 15_{total} - 15_{C_2H_6} = 15_{total} - (30_{C_2H_6} * a + b)$$

Where a and b are the slope and intercept of the linear fit. Specifically, $$a = \frac{15_{C_2H_6}}{30_{C_2H_6}}$$

The resulting m/z 15 signal is representative of the methane while the original m/z 30 signal is representative of the ethane. Applying this deconvolution procedure resulted in minimal changes to the m/z 15 signal. (Data not shown.)

Quantification of MS Data: Determination of Integration Bounds: Once the MS signals were deconvoluted into individual products, the calibration curves were used to convert the m/z 15, 30, and 44 signals to molar fluxes of $CH_4$, $C_2H_6$, and $CO_2$, respectively. Total product yields were then determined through integration. To set the baseline for integration, the noise level was quantified by exposing an unbiased electrode to 1 mL/min He for 500 s. The baseline for integration was then set to 3 standard deviations above the average blank signal strength. The signal and corresponding flux baselines for each species are presented in Table 3. The product yield for each step was calculated by integrating across the duration of the oxidative or reductive potential hold.

TABLE 3

The MS signal and molar flux baseline levels used for the integration of EC-MS data to obtain product yields for $CH_4$, $C_2H_6$, and $CO_2$.

| Species | MS Signal - 3 Std Dev Above Mean (A) | Flux (nmol/sec) |
| --- | --- | --- |
| $CH_4$ | 1.30E-13 | 7.84E-3 |
| $C_2H_6$ | 2.12E-13 | 2.23E-2 |
| $CO_2$ | 2.15E-13 | 1.22E-2 |

Quantification of MS Data: $CO_2$: To quantify the $CO_2$ produced from ethane oxidation, each experiment was preceded by two control runs using the same potential profile, but in the absence of ethane. These runs resulted in $CO_2$ peaks measured during the oxidative step as a result of organic impurities that were not able to be fully removed from the system (data not shown). The second $CO_2$ blank was used as the background signal and was subtracted from the oxidative ethane signal to improve accuracy. Running three sequential blanks resulted in a similar $CO_2$ signal to two blanks within 15%, indicating that two blanks were enough to ensure accuracy (data not shown).

CONCLUSION

Using a model system based on ethane, this example demonstrates the feasibility of more generally using the disclosed method of cyclically varying electrical potentials to break C—C bonds in one or more chemical reactants to make one or more desired chemical products.

Those skilled in the art will recognize, or be able to ascertain using no more than routine experimentation, numerous equivalents to the specific materials and methods described herein. Such equivalents are considered to be within the scope of this disclosure and encompassed by the following claims.

The invention claimed is:

1. A method for producing one or more desired chemical products from one or more chemical reactants comprising one or more $sp^3$-hybridized C—C bonds, the method comprising:

(a) contacting a feedstock comprising an electrolyte and at least one reactant comprising at least one $sp^3$-hybridized C—C bond to at least one pair of separated electrodes and applying a reactant adsorption electrical potential to the at least one electrode pair, whereby at least a portion of the at least one reactant is adsorbed to at least one electrode of the at least one electrode pair;

(b) applying a C—C bond breaking electrical potential to the at least one electrode pair, whereby the at least one $sp^3$-hybridized C—C bond in the one or more adsorbed reactants is broken, thereby yielding one or more desired chemical products formed from the breaking of the at least one $sp^3$-hybridized C—C bond; and (c) applying a desorption electrical potential to the at least one electrode pair, whereby the one or more desired chemical products are released from the at least one electrode into the region between the at least one electrode pair;

wherein steps (a), (b), and (c) are conducted at a temperature of between about 0° C. and below 100.0° C.;

wherein the at least one reactant comprises a saturated hydrocarbon or a polymer whose backbone comprises carbon atoms; and wherein the desired chemical products are $C_1$-$C_{10}$ linear, branched, or cyclic alkanes.

2. The method of claim 1, wherein steps (a), (b), and (c) are conducted at a temperature of between about 0.0° C. and 50° C.

3. The method of claim 1, wherein steps (a), (b), and (c) are conducted at a temperature of between about 4° C. and about 30° C.

4. The method of claim 1, wherein steps (a), (b), and (c) are conducted at a temperature of between about 15° C. and about 30° C.

5. The method of claim 1, wherein steps (a), (b), and (c) are conducted at a temperature of between about 15° C. and about 30° C., and without an externally applied source of heat other than the applied electrical potentials.

6. The method of claim 1, wherein steps (a), (b), and (c) are conducted within a flow cell, wherein the feedstock is continuously flowed through the flow cell.

7. The method of claim 1, wherein the feedstock is in the gas phase.

8. The method of claim 1, wherein steps (a), (b) and (c) are repeated through multiple cycles.

9. The method of claim 8, wherein the electrical potentials of steps (a), (b) and (c) are applied to the at least one electrode pair through multiple continuous alternating electrical potential cycles.

10. The method of claim 9, wherein the alternating electrical potential cycles occur at a rate of 0.001 Hz to 10,000.0 Hz.

11. The method of claim 1, wherein the reactant adsorption electrical potential applied to the at least one electrode pair is positive of potential zero charge (PZC) of the feedstock and any catalyst included on the at least one electrode pair.

12. The method of claim 11, wherein the applied reactant adsorption electrical potential applied is between about 0.05 V and about 1.2 V relative to a reversible hydrogen electrode.

13. The method of claim 1, wherein the at least one electrode pair comprise a conductive carbon support.

14. The method of claim 1, wherein the at least one electrode pair comprise one or more metals.

15. The method of claim 14, wherein the one or more metals are selected from the group consisting of Pt, Au, Ag, Cu, Fe, Rh, Ni, Pd, Ir, Co, V, Cr, Sn, Ti, W, and alloys, sulfides, nitrides, oxides, and carbides thereof.

16. The method of claim 15, wherein the at least one electrode pair comprise a compound alloy selected from the group consisting of CoMo sulfide, NiMo sulfide, Mn oxide/$SnO_2$, Co oxide/$SnO_2$, MoV mixed metal oxide (MMO), TeNb MMO, and W-doped MoVMn.

17. The method of claim 1, wherein the at least one reactant comprises the polymer whose backbone comprises carbon atoms, and wherein the polymer is obtained from recycled plastic or waste plastic.

18. The method of claim 1 wherein the at least one reactant is selected from the group consisting of ethane, propane, butane, pentane, octane, an addition polymer, and a condensation polymer.

19. The method of claim 18, wherein the addition polymer or condensation polymer is selected from the group consisting of low-density polyethylene (LDPE), high-density polyethylene (HDPE), polyvinyl chloride, and polystyrene.

20. The method of claim 1, wherein the desired chemical products are selected from the group consisting of methane, ethane, propane, and butane.

21. The method of claim 1, wherein in step (c) the desorption electrical potential is less than 0.2 volts relative to a reversible hydrogen electrode (RHE).

22. The method of claim 1, wherein in step (c) desorption occurs without generating hydrogen.

23. The method of claim 1, wherein the electrolyte comprises an acid.

24. The method of claim 1, wherein the feedstock has a pH of between 0 and 2.

25. A method for producing one or more desired chemical products from one or more chemical reactants comprising one or more $sp^3$-hybridized C—C bonds, the method comprising:

(a) contacting a feedstock comprising an electrolyte and at least one reactant comprising at least one $sp^3$-hybridized C—C bond to at least one pair of separated electrodes and applying a reactant adsorption electrical potential to the at least one electrode pair, whereby at least a portion of the at least one reactant is adsorbed to at least one electrode of the at least one electrode pair;

(b) applying a C—C bond breaking electrical potential to the at least one electrode pair, whereby the at least one $sp^3$-hybridized C—C bond in the one or more adsorbed reactants is broken, thereby yielding one or more desired chemical products formed from the breaking of the at least one $sp^3$-hybridized C—C bond; and (c) applying a desorption electrical potential to the at least one electrode pair, whereby the one or more desired chemical products are released from the at least one electrode into the region between the at least one electrode pair;

wherein steps (a), (b), and (c) are conducted at a temperature of between about 0° C. and below 100.0° C.;

wherein the at least one reactant comprises a saturated hydrocarbon or a polymer whose backbone comprises carbon atoms;

wherein the desired chemical products are $C_1$-$C_{10}$ linear, branched, or cyclic alkanes; and wherein steps (a), (b), and (c) are conducted within a flow cell, wherein the feedstock is continuously flowed through the flow cell.

* * * * *